United States Patent
Hunt, Jr. et al.

(10) Patent No.: US 11,629,312 B2
(45) Date of Patent: *Apr. 18, 2023

(54) SOLVENT APPLICATION IN BOTTLE WASH USING AMIDINE BASED FORMULAS

(71) Applicant: ECOLAB USA INC., Saint Paul, MN (US)

(72) Inventors: Clinton Hunt, Jr., Saint Paul, MN (US); Michael Chen, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 216 days.

This patent is subject to a terminal disclaimer.

(21) Appl. No.: 17/247,604

(22) Filed: Dec. 17, 2020

(65) Prior Publication Data

US 2021/0108157 A1    Apr. 15, 2021

Related U.S. Application Data

(63) Continuation of application No. 16/292,544, filed on Mar. 5, 2019, now Pat. No. 10,899,999, which is a
(Continued)

(51) Int. Cl.
*C23G 1/02*     (2006.01)
*C11D 3/28*     (2006.01)
(Continued)

(52) U.S. Cl.
CPC .................. *C11D 3/28* (2013.01); *B08B 3/08* (2013.01); *B08B 3/10* (2013.01); *B08B 9/083* (2013.01);
(Continued)

(58) Field of Classification Search
CPC .................................. C11D 1/46; C11D 1/521
(Continued)

(56) References Cited

U.S. PATENT DOCUMENTS 4,362,570 A    12/1982    Elwell
4,517,025 A     5/1985    Plante et al.
(Continued)

FOREIGN PATENT DOCUMENTS

CO    200096        8/1997
EP    1755003 A1    2/2007
(Continued)

OTHER PUBLICATIONS

Ecolab USA Inc., PCT/US2017/018090 filed Feb. 16, 2017, "The International Search Report and The Written Opinion of the International Searching Authority, or the Declaration", dated Jun. 1, 2017.
(Continued)

*Primary Examiner* — Gregory E Webb
(74) *Attorney, Agent, or Firm* — McKee, Voorhees & Sease, PLC

(57) ABSTRACT

According to the invention, the compositions and methods provide for the complete removal of labels, synthetic glues and/or adhesives from a plurality of surfaces through the use of an aqueous or non-aqueous basic organic solvent and/or an amidine, optionally in combination with surfactants, chelants, acidulants and/or additional bottle wash additives. Beneficially, the compositions and methods are suitable for use at lower temperatures and pH conditions, along with under caustic-free and/or reduced caustic conditions to effectively remove such labels, synthetic glues and/or adhesives from a surface within less than about 30 minutes.

19 Claims, 10 Drawing Sheets

(10 of 10 Drawing Sheet(s) Filed in Color)

Related U.S. Application Data continuation of application No. 15/434,356, filed on Feb. 16, 2017, now Pat. No. 10,266,794.

(60) Provisional application No. 62/428,262, filed on Nov. 30, 2016, provisional application No. 62/296,968, filed on Feb. 18, 2016.

(51) Int. Cl.
| | |
|---|---|
| *B08B 9/08* | (2006.01) |
| *B29C 63/00* | (2006.01) |
| *C11D 11/00* | (2006.01) |
| *C11D 1/46* | (2006.01) |
| *C11D 1/52* | (2006.01) |
| *B08B 3/08* | (2006.01) |
| *B08B 3/10* | (2006.01) |
| *B32B 43/00* | (2006.01) |
| *C11D 1/22* | (2006.01) |
| *C11D 3/18* | (2006.01) |
| *C11D 3/32* | (2006.01) |
| *C11D 3/34* | (2006.01) |
| *C11D 3/43* | (2006.01) |

(52) U.S. Cl.
CPC ........ *B29C 63/0013* (2013.01); *B32B 43/006* (2013.01); *C11D 1/22* (2013.01); *C11D 1/46* (2013.01); *C11D 1/521* (2013.01); *C11D 1/528* (2013.01); *C11D 3/188* (2013.01); *C11D 3/32* (2013.01); *C11D 3/3418* (2013.01); *C11D 3/43* (2013.01); *C11D 11/0035* (2013.01)

(58) Field of Classification Search
USPC .................................... 134/25.1, 3; 510/200
See application file for complete search history.

(56) References Cited

U.S. PATENT DOCUMENTS

| | | | |
|---|---|---|---|
| 5,512,613 | A | 4/1996 | Afzali-Ardakani et al. |
| 5,728,179 | A | 3/1998 | Gehling et al. |
| 6,017,863 | A | 1/2000 | Cala et al. |
| 6,515,167 | B1 | 2/2003 | Shieh et al. |
| 6,596,877 | B2 | 7/2003 | Shieh et al. |
| 6,818,608 | B2 | 11/2004 | Moore |
| 7,005,409 | B2 | 2/2006 | Esposito et al. |
| 7,393,419 | B2 | 7/2008 | Sachdev et al. |
| 7,723,280 | B2 | 5/2010 | Brainard et al. |
| 8,957,007 | B2 | 2/2015 | Moorre |
| 8,968,868 | B2 | 3/2015 | Yang et al. |
| 8,968,869 | B2 | 3/2015 | Yang et al. |
| 9,023,716 | B2 | 5/2015 | Lee et al. |
| 9,133,426 | B2 | 9/2015 | Hunt, Jr. et al. |
| 9,487,735 | B2 | 11/2016 | Hunt, Jr. et al. |
| 10,266,794 | B2 | 4/2019 | Hunt, Jr. et al. |
| 10,899,999 | B2 * | 1/2021 | Hunt, Jr. .................. C11D 1/46 |

| | | | |
|---|---|---|---|
| 2002/0039988 | A1 | 4/2002 | Kusturi et al. |
| 2003/0050203 | A1 * | 3/2003 | Herdt ..................... C11D 3/361 |
| | | | 510/180 |
| 2003/0148904 | A1 | 8/2003 | Moore |
| 2005/0192194 | A1 | 9/2005 | Esposito et al. |
| 2007/0078073 | A1 | 4/2007 | Auger |
| 2007/0134443 | A1 | 6/2007 | Yokoyama et al. |
| 2007/0148370 | A1 | 6/2007 | Maenou et al. |
| 2007/0187646 | A1 | 8/2007 | Fellers |
| 2009/0025851 | A1 | 1/2009 | Huck |
| 2010/0240566 | A1 | 9/2010 | Meine et al. |
| 2013/0206166 | A1 | 8/2013 | Moorre |
| 2013/0303422 | A1 | 11/2013 | Hunt, Jr. et al. |
| 2014/0202894 | A1 | 7/2014 | Smith et al. |
| 2014/0213039 | A1 | 7/2014 | Lee et al. |
| 2014/0336093 | A1 | 11/2014 | Koellnberger et al. |
| 2014/0352740 | A1 | 12/2014 | Hunt, Jr. et al. |
| 2015/0052689 | A1 | 2/2015 | Armstrong et al. |
| 2015/0094249 | A1 | 4/2015 | Peters et al. |
| 2015/0098745 | A1 | 4/2015 | Brown et al. |
| 2015/0267112 | A1 | 9/2015 | Dory et al. |
| 2017/0207940 | A1 | 7/2017 | Kim et al. |

FOREIGN PATENT DOCUMENTS

| | | | |
|---|---|---|---|
| JP | 5713319 | A | 8/1982 |
| JP | 5209194 | A | 8/1993 |
| JP | 73290 | A | 1/1995 |
| JP | 2004331927 | A | 11/2004 |
| JP | 2010138271 | A | 6/2010 |
| JP | 2012201748 | A | 10/2012 |
| JP | 2014500898 | A | 1/2014 |
| WO | 9732963 | A1 | 9/1997 |
| WO | 2010037109 | A2 | 4/2010 |
| WO | 2010147044 | A1 | 12/2010 |
| WO | 2013162926 | A1 | 10/2013 |
| WO | 2014202894 | A1 | 12/2014 |
| WO | 2015068823 | A1 | 5/2015 |
| WO | 2015142778 | A1 | 9/2015 |
| WO | 2016000222 | A1 | 1/2016 |

OTHER PUBLICATIONS

Steposol M-8-10, Product Bulletin, Stepan Company, 2 pages, Jun. 2017.
Wikipedia, 1,8-Diazabicycloundec-7-ene, 3 pages. Nov. 16, 2015.
Wikipedia, Hofmeister Series, 2 pages. Dec. 29, 2015.
Masters, Ron A., "The Power of "ene" in Water-Based Cleaners and Removers: A New-to-theWorld Metathesis-Based Surfactant Makes Water Work Like an Organic Solvent", Presentation, 106th AOCS Annual Meeting and Industry Showcases May 6, 2015.
James, "Nucleophilicity vs. Basicity", www.masterorganicchemistry.com, Jun. 6, 2016.
Stepan Company, Technical Information, "STEPOSOL MET-10U, Surfactant Solution to Solvent Replacement", 2 pages, Feb. 2015.
Stepan Company, STEPOSOL MET-10U, Brochure, 2014.

* cited by examiner

SOLVENT APPLICATION IN BOTTLE WASH USING AMIDINE BASED FORMULAS

CROSS REFERENCE TO RELATED APPLICATIONS

This is a Continuation Application of U.S. Ser. No. 16/292,544, filed Mar. 5, 2019, which is a Continuation Application of U.S. Ser. No. 15/434,356, filed Feb. 16, 2017, now U.S. Pat. No. 10,266,794, issued on Apr. 23, 2019, which application claims priority to and is related to U.S. Provisional Application Ser. No. 62/428,262, filed on Nov. 30, 2016 and 62/296,968, filed on Feb. 18, 2016. The entire contents of these patent applications are hereby expressly incorporated herein by reference including, without limitation, the specification, claims, and abstract, as well as any figures, tables, or drawings thereof.

FIELD OF THE INVENTION

The invention relates to compositions and methods useful in the removal of neck foil labels and adhesive residues from a surface, such as returnable bottles and similar containers used in the beverage and food industry employing adhesive based labels. The methods and compositions require substantially lower amounts of time to remove such labels and adhesive residues from a surface, namely less than about 30 minutes without requiring highly caustic compositions, high temperature conditions and/or mechanical or manual agitation for removal. In an aspect, the label removing compositions comprise an aqueous or non-aqueous basic organic solvent and/or an amidine solvent in combination with wetting surfactants. In an aspect, the methods of invention remove labels without destruction of the same.

BACKGROUND OF THE INVENTION

It is common practice in the bottling industry to reuse, recycle, re-wash and refill returned bottles after consumer use of the item in an effort towards economy in the industry. Synthetic glues or adhesives are commonly used to affix labels and other items to surfaces, including bottles. Exemplary disclosures of synthetic glues and adhesives are provided in U.S. Pat. No. 6,803,085, which is incorporated herein by reference in its entirety. It is desirable to fully remove soils to clean the bottles as well as remove the labeling and any remaining adhesive residue left on the surface prior to cleaning, disinfecting and reuse. Unfortunately, various adhesives, including synthetic glues can be difficult to remove from surfaces such as glass bottles and any incomplete removal presents difficulty in reusing the item. In addition, conventional removal methods may only partially remove labels and/or destroy the labels creating additional buildup in the cleaning solutions (e.g. partially degraded labels).

It is known that bottle wash additives and alkaline detergent compositions along with bottle washing operations may be used to clean returned bottles. Numerous conventional aqueous-based bottle washing compositions contains caustics, alcohols, nonionic surfactants and/or other additives. Exemplary disclosures of bottle washing operations include U.S. Pat. No. 2,976,248 titled "Bottle Washing Composition and Method," filed Aug. 1, 1957, and U.S. Pat. No. 6,530,386 titled "Method of Cleaning Returnable Bottles," filed Jan. 25, 2000. However, such additives and detergents often incompletely remove adhesives and leave residues or deposits on the surfaces, providing commercially undesirable results. In addition, commercially-available bottle wash additives often require repeated use to fully remove residues, utilize harsh cleaning conditions and/or require of large amounts of cleaning solutions or concentrates, all of which increase the time and cost of bottle washing.

These limitations in the practices of the bottling industry are further complicated with the removal of foil (or aluminum-type) labels, which even the harshest caustic-based label removing compositions provide little ineffective label removal. Such metallic labels are often shaped or adhered to the bottle neck presenting additional difficulties in removal of the adhesives, including additional manual labor required in the event a label removing composition in a bottle washing application is unable to completely remove the labels and/or adhesives.

It is therefore desirable to provide cleaning solutions and methods of use according to the invention that provide for the complete removal of metallic bottle labels, glues and adhesives. This is a difficult task to design cleansing compositions and methods for the removal of such adhesive and other substances.

Accordingly, it is an objective of the claimed invention to develop methods for complete removal of various types of adhesives and other residues from surfaces, such as metallic labels and adhesive residue on returnable glass bottles.

A further object of the invention is novel label removing compositions for removal of various labels, including the most difficult to remove aluminum labels from glass bottles.

A still further object of the invention is to develop methods for removal of adhesive labels and residue at reduced temperature, including ambient or room temperature.

A still further object of the invention is to develop methods for removal of adhesive labels and residue at reduced caustic levels, i.e., in an amount from about 0 wt-% to about 2 wt-%, including use of label removing compositions which are caustic-free.

A still further object of the invention is to develop methods for removal of adhesive labels and residue in a period of less than about 30 minutes, and preferably less than about 15 minutes.

A still further object of the invention is to develop methods for removal of adhesive labels without destroying the labels and/or causing pulping. These and other objects of the invention are illustrated in the description of the invention. Other objects, advantages and features of the present invention will become apparent from the following specification taken in conjunction with the accompanying drawings.

BRIEF SUMMARY OF THE INVENTION

Methods and compositions comprise an aqueous or non-aqueous basic organic solvent and/or an amidine solvent in combination with wetting surfactants for complete removal of adhesive material from a bottle, such as glass bottles, are provided. The methods and compositions remove labels and adhesive residue using a preferred solvent system allowing lower temperature and caustic-free and/or reduced caustic conditions. An advantage of the invention is the complete removal of adhesive residues on bottles, including metallic labels, providing convenient and cost-effective removal which is achieved in a shortened period of time of less than about 60 minutes, less than about 30 minutes and preferably less than about 15 minutes. The invention provides advantages over commercially-available label removing compositions and methods by both completely removing bottle labels along with the underlying adhesive residue.

In an embodiment, the present invention is a method for removing soils, labels and other adhesive material from a surface comprising: applying a label removing composition to a surface in need of removal of an adhesive material, wherein the label removing composition comprises an aqueous or non-aqueous basic organic solvent and/or an amidine solvent, a surfactant, wherein the composition further comprises caustic in an amount from about 0 wt-% to about 2 wt-%; and removing said soils, labels and other adhesive material from the surface within a period of time less than about 60 minutes; wherein the temperature of the label removing composition is below about 80° C., and wherein the pH of the label removing composition is between about 10 and about 14.

In an embodiment, the present invention is a composition for removing soils, labels and other adhesive material from a hard surface comprising: an aqueous or non-aqueous basic organic solvent and/or an amidine solvent; and at least one surfactant; and wherein the composition further comprises caustic in amount from about 0 wt-% to about 2-wt %, and wherein the composition has a pH between about 10 and about 14.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DESCRIPTION OF THE FIGURES

The patent or application file contains at least one drawing executed in color. Copies of this patent or patent application publication with color drawing(s) will be provided by the Office upon request and payment of the necessary fee.

Figure 1A:
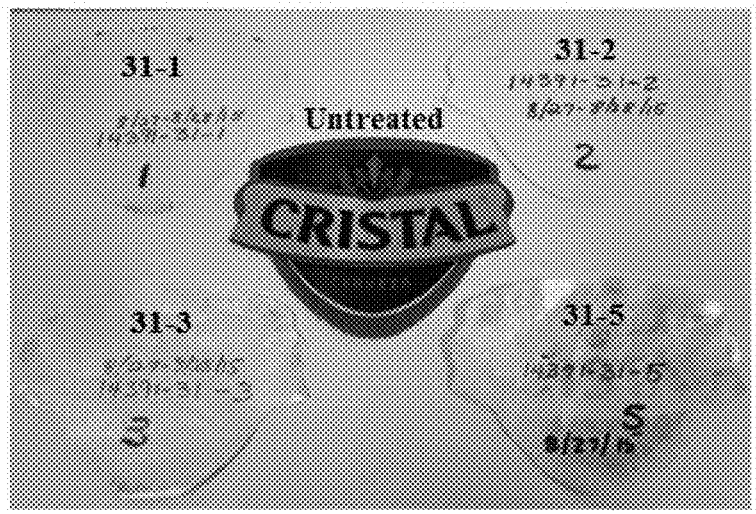
FIG. 1A shows CRISTAL Beer Bottle Label before (center) and after treatment with four experimental formulas that contain a neutral base according to embodiments of the invention.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to methods and compositions for complete removal of adhesive material from a bottle, such as glass bottles. The compositions and methods of the present invention have many advantages over conventional bottle washing compositions used to remove adhesive labels. For example, the methods achieve substantially complete and/or complete removal of adhesive labels while using lower temperature, less time and/or lower caustic conditions. In an aspect, the compositions and methods provide removal of the adhesive labels within less than about 30 minutes and preferably less than about 15 minutes, at temperatures below about 60° C. or preferably between about 50° C. and about 60° C., and in a non-caustic and/or reduced caustic alkaline solution, including at a pH between about 12 and about 14. An advantage of the invention is the complete removal of adhesive residues on bottles, providing convenient and cost-effective removal. The invention provides advantages over commercially-available label removing compositions and methods by both completely removing bottle labels.

The embodiments of this invention are not limited to particular compositions or methods for removal of residues, including synthetic glue residues, from bottle surfaces, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

The terms "adhesive," "adhesive residue," "glue," and variations thereof, as used herein, refer to any synthetic adhesive or glue used to adhere a substance to a surface, namely glass surfaces such as glass bottles with labels adhered to its surface, including metallic labels. According to the invention, examples of adhesives include polyacrylic acid adhesives, or any polymer of a polycarboxylate.

The term "alkyl" refers to a straight or branched chain monovalent hydrocarbon radical having a specified number of carbon atoms. Alkyl groups may be unsubstituted or substituted with substituents that do not interfere with the specified function of the composition and may be substituted once or twice with the same or different group. Substituents may include alkoxy, hydroxy, mercapto, amino, alkyl substituted amino, nitro, carboxy, carbanoyl, carbanoyloxy, cyano, methylsulfonylamino, or halogen, for example. Examples of "alkyl" include, but are not limited to, methyl, ethyl, n-propyl, isopropyl, n-butyl, s-butyl, t-butyl, n-pentyl, n-hexyl, 3-methylpentyl, and the like.

The term "alkoxy" refers to a straight or branched chain monovalent hydrocarbon radical having a specified number of carbon atoms and a carbon-oxygen-carbon bond, may be unsubstituted or substituted with substituents that do not interfere with the specified function of the composition and may be substituted once or twice with the same or different group. Substituents may include alkoxy, hydroxy, mercapto, amino, alkyl substituted amino, nitro, carboxy, carbanoyl, carbanoyloxy, cyano, methylsulfonylamino, or halogen, for example. Examples include methoxy, ethoxy, propoxy, t-butoxy, and the like.

As used herein, the phrase "applied color design" refers to a design, decoration, decorative element, or label that is applied in a fashion which is intended to be permanent while the article, for example a bottle, is in circulation, use, and/or reuse. One type of applied color design is referred to herein as an "applied ceramic label" (ACL). An applied ceramic label is a label that is applied in a fashion which is intended to be permanent while the article, e.g. bottle, is in circulation, use and/or reuse.

As used herein, the term "free" or "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%. In an embodiment of the invention the label removing compositions are substantially free of caustic and other caustic containing components (e.g. alkalinity sources), preferably the label removing compositions are free of caustic and other caustic containing components.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients (or method steps) of the present invention as well as other components and ingredients (or method steps) described herein. As used herein, "consisting essentially of" means that the methods and compositions may include additional steps, components or ingredients, but only if the additional steps, components or ingredients do not materially alter the basic and novel characteristics of the claimed methods and compositions.

While an understanding of the mechanism is not necessary to practice the present invention and while the present invention is not limited to any particular mechanism of action, it is contemplated that, in some embodiments the compositions of the invention and methods of using the same provide significant advantage over commercially-available bottle wash additives and cleaning methods. According to the invention, both bottle labels (e.g. metallic and other materials) along with the underlying adhesive residue are completely removed without compromising overall bottle cleaning performance and/or creating any pulping or other residue in the label removal system. Cleaning performance according to the invention exceeds that of existing commercially-available bottle wash additives that fail to completely remove adhesive residue from bottles, namely metallic labels such as aluminum labels. As a result, the compositions and methods according to the invention represent a significant advantage in cost savings and efficiency for industries including recycling and reuse of bottles, namely glass bottles.

According to the invention, the compositions and methods provide for the complete removal of synthetic glues and/or adhesives through the use of an aqueous or non-aqueous basic organic solvent and/or an amidine solvent in combination with wetting surfactants and other optional additional ingredients. The label removing compositions according to the invention allow the use of lower temperatures, non-caustic and/or reduced caustic concentrations and reduced time required for the removal of the synthetic glues and/or adhesives. Although not intending to be limited to a particular theory, the compositions and methods according to the invention provide chemistry that is capable of penetrating the synthetic glues and/or adhesives in order to solubilize the synthetic glues and/or adhesives. The steps of penetrating and solubilizing the synthetic glues and/or adhesives beneficially allow the complete removal of labels intact.

In an aspect, the compositions and methods according to the invention provide label removing compositions having an alkaline pH. For example, the alkaline pH may be from about 9 to about 14, preferably from about 10 to about 14, and more preferably from about 12 to about 14, e.g., 9-10, 9-11, 9-12, 9-13, 9-14, 10-11, 10-12, 10-13, 10-14, 11-12, 11-13, 11-14, 12-13-, 12-14, or 13-14.

In an aspect, the compositions and methods according to the invention provide label removing compositions suitable for use under any suitable conditions or temperature. In some embodiments, the label removing compositions are configured to be contacted with surface (such as a bottle) in need of label and/or adhesive removal at a temperature ranging from about 30° C. to about 60° C., about 35° C. to about 60° C., about 40° C. to about 60° C., about 45° C. to about 60° C., about 50° C. to about 60° C., or about 55° C. to about 60° C., e.g., about 30° C.-35° C., 35° C.-40° C., 40° C.-45° C., 45° C.-50° C., 50° C.-55° C., 55° C.-60° C., or any ranges there between.

In an aspect, the compositions and methods according to the invention provide efficacious label removing without a decreased amount of time compared to conventional low-temperature label removing compositions. For example, the label removing compositions provide removal within a period of time of less than about 30 minutes, or preferably within less than about 15 minutes, e.g., less than about 30 minutes, 25 minutes, 20 minutes, 15 minutes, 10 minutes, or 5 minutes or less. In other aspects, the label removing compositions provide removal within a period of time of less than about 2 hours, or preferably within less than about 60 minutes, e.g., less than about 2 hours, 1 hour, 60 minutes, 50 minutes, 45 minutes, 40 minutes, 35 minutes, 30 minutes, 25 minutes, 20 minutes, 15 minutes, 10 minutes, or 5 minutes or less.

Label Removing Compositions

The label removing compositions according to the invention are particularly suitable for various bottle washing applications, including label and/or adhesive removal along with other soils as may be present on such surfaces. The label removing compositions provide efficient and effective label removal, while reducing the overall cost of the chemical compositions, reducing the temperature conditions, eliminating and/or reducing the use of caustic conditions and/or mechanical effects required for the label removal and cleaning of the article. The label removing compositions according to the invention may comprise, consist of and/or consist essentially of an aqueous or non-aqueous basic organic solvent and/or an amidine. The compositions may also include a chelant, acidulant, additional solvents, surfactants and/or other functional ingredients as set forth herein the description of the invention.

Various embodiments of the label removing compositions are shown in Table 1 (Non-aqueous solvent-based compositions) and Table 2 (Aqueous solvent-based compositions).

TABLE 1

(Non-aqueous solvent-based compositions)

| Component | Wt-% Ranges | | |
|---|---|---|---|
| Amidine Solvents | 30-70 | 40-70 | 50-65 |
| Additional Solvents | 5-50 | 10-50 | 20-40 |
| Surfactants | 5-50 | 5-25 | 10-20 |

TABLE 1-continued (Non-aqueous solvent-based compositions)

| Component | Wt-% Ranges | | |
|---|---|---|---|
| Sodium Hydroxide (caustic) | 0-2 | 0-1 | 0-0.5 |
| Other Components (e.g. hydrotropes) | 0-20 | 0.1-20 | 1-10 |

TABLE 2

(Aqueous solvent-based compositions)

| Component | Wt-% Ranges | | |
|---|---|---|---|
| Amidine Solvents | 1-20 | 5-20 | 7-15 |
| Additional Solvents | 0.01-15 | 0.1-15 | 5-15 |
| Surfactants | 0-50 | 5-40 | 10-30 |
| Water | 5-90 | 10-80 | 20-70 |
| Sodium Hydroxide (caustic) | 0-2 | 0-1 | 0-0.5 |
| Other Components (e.g. hydrotropes) | 0-20 | 0.1-20 | 1-10 |

In an aspect of the invention, a solvent (e.g. an amidine) provides a means for effective label removal from a treated surface. In an alternative aspect of the invention, a single solvent (e.g. an amidine) and/or solvent in combination with water can provide a means for effective label removal from a treated surface. In preferred embodiments, the label removing composition further comprises at least one wetting surfactant (preferably a combination of surfactants), and optionally further includes any one or more of the additional functional ingredients as described herein.

In a preferred aspect, the compositions have reduced caustic concentration which as referred to herein is a concentration less than about 2.00 wt % of any strong base (e.g. KOH, NaOH) or strong alkali, more preferably less than about 1.5 wt %, and even more preferably less than about 0.5 wt %. In a further preferred aspect, the compositions are caustic-free and do not include any strong base (e.g. KOH, NaOH) or strong alkali therein. In a preferred aspect, the compositions are acetate-free, as the compositions do not require buffering. In a further aspect, the compositions are free of fluoride components, as they are not employed for any leaching and/or removal of sulfides from the labels and/or adhesives employed herein. Without being limited to a particular mechanism of action, the present compositions exclude fluoride components, such as organo-fluorines.

In a preferred aspect, the compositions are aqueous systems. In a preferred aspect, the compositions employ water in the aqueous solutions.

Solvent

The compositions according to the invention include a solvent. A solvent or combination of solvents is useful in the label removing compositions of the invention to enhance certain adhesive removal properties. In an aspect, suitable solvents may include non-aqueous or aqueous amidine solvents. Suitable solvents include an aqueous or non-aqueous basic organic solvents, including an amidine solvent. In an aspect, water may be used in combination with the aqueous or non-aqueous basic organic solvents disclosed herein. In some aspects the water is included as a diluent for the label removing compositions. The water can include water from any source including deionized water, tap water, softened water, and combinations thereof.

In a preferred aspect, the solvents are organic molecules. In a further preferred aspect, the solvents are basic solvents which replace sodium hydroxide solvents conventionally employed in various bottle washing compositions for label removal.

Amidine Solvents

In an aspect, an amidine solvent is included in the label removing composition. An amidine solvent is a non-nucleophilic base. A preferred amidine solvent is 1,8-Diazabicyclo[5.4.0]undec-7-ene, or also may be referred to as 2,3,4,6,7,8,9,10-Octahydropyrimidol[1,2-a]azepine (or DBU), having the formula ($C_9H_{16}N_2$):

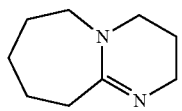

Use of an amidine solvent provides beneficial hard surface cleaning and label and/or adhesive removal. Without being limited to a particular mechanism of action and/or theory of the invention, it is unexpected that the amidine solvent would be suitable for use with aqueous or non-aqueous basic organic solvents and for hard surface cleaning, as the compounds are known only for use as reagents in organic chemistry, including use as a catalyst, a complexing ligand, and/or a curing agent for epoxy.

Enamide Solvents

Suitable amides solvents also include for example enamide solvents. Exemplary amides are for example, N,N-dialkyl amides, namely fatty N,N-dialkyl amides. Various fatty dialkyl amides have been used in cleaning compositions, such as non-aqueous solvent-based degreasers (such as disclosed in U.S. Patent Publication No. 2011/0192421). Suitable amide solvents for application according to the invention include fatty dialkyl amides, fatty amidoamines and/or fatty esteramines.

In a preferred aspect, the label removal compositions include a fatty acid derivative or fatty N,N-dialkyl amide, N,N-dialkyl esteramine, N,N-dialkyl amidoamine and/or combinations thereof. In a preferred aspect, the fatty solvent has the general structure:

$$R^1—CO-X_m-A_n-NR^2R^3$$

where $R^1$ is a $C_9-C_{16}$ chain that is linear or branched, saturated or unsaturated; X is O or NH; A is $C_2-C_8$ alkylene; m is 0 or 1; n is 0 or 1; and $R^2$ and $R^3$ are the same or different $C_1-C_6$ alkyl. When m=1, n=1, and when m=0, n=0. For the N,N-dialkyl amides, m=n=0. For the N,N-dialkyl esteramines, m=n=1 and X=O. For the N,N-dialkyl amidoamines, m=n=1 and X=NH. Additional disclosure of suitable amide and enamide solvents is disclosed in U.S. Publication No. 2015/0098745, which is herein incorporated by reference in its entirety.

In a further preferred aspect, the amide is n,n-dimethyl 9-decenamide (generally referred to as a dimethylamine enamide) having the following structure:

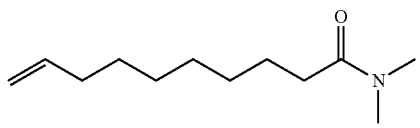

(commercially available from Stepan Company).

Amine Solvents

Suitable amine solvents include, for example, primary, secondary, and/or tertiary amines. Primary, secondary and/or tertiary amines, include monoamines with Cis alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like. Additional amines may include poly sulfonate ammonium salts, as for example, alkylpoly sulfonate ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted poly sulfonate ammonium chloride such as dimethyl-1-naphthylmethylammonium chloride. Amines may further include diamines carrying at least one nitrogen linked hydrocarbon group, which represents a saturated or unsaturated linear or branched alkyl group having at least 10 carbon atoms and preferably 16-24 carbon atoms, or an aryl, aralkyl, or alkaryl group containing up to 24 carbon atoms, and wherein the optional other nitrogen linked groups are formed by optionally substituted alkyl groups, aryl group or aralkyl groups or polyalkoxy groups. Amines may also include amine salt such as monoethanolamine, diethanolamine or triethanolamine. Alkanolamines are also included within the scope of amines useful in combination with the other ingredients of the label removing compositions. Typical examples of alkanolamines include monoethanolamine, monopropanolamine, diethanolamine, dipropanolamine, triethanolamine, tripropanolamine and the like. Amines may also include amino alcohols. Typical examples of amino alcohols include 2-amino-2-methyl-1-propanol, 2-amino-1-butanol, 2-amino-2-methyl-1,3-propanediol, 2-amino-2-ethyl-1,3-propanediol, hydroxymethyl aminomethane, and the like.

D-Limonene Solvent

Suitable solvents may include biodegradable cleaning solvents, terpene-containing solvents such as d-limonene. As D-limonene is not water-miscible it is not desirable for aqueous-based label removing compositions as a solvent. However, d-limonene is a suitable solvent for non-aqueous solvent based label removal compositions according to the invention.

Alcohol and Polyol Solvents

Suitable solvents may include organic solvents, such as alcohols or polyols, and oxygenated solvents, such as lower alkanols, lower alkyl ethers, glycols, aryl glycol ethers and lower alkyl glycol ethers. Additional examples of useful solvents include various alcohols, including methanol, ethanol, propanol, isopropanol and butanol, isobutanol, ethylene glycol, diethylene glycol, triethylene glycol, propylene glycol, dipropylene glycol, mixed ethylene-propylene glycol ethers, ethylene glycol phenyl ether, and propylene glycol phenyl ether. Substantially water soluble glycol ether solvents include propylene glycol methyl ether, propylene glycol propyl ether, dipropylene glycol methyl ether, tripropylene glycol methyl ether, ethylene glycol butyl ether, diethylene glycol methyl ether, diethylene glycol butyl ether, ethylene glycol dimethyl ether, ethylene glycol propyl ether, diethylene glycol ethyl ether, triethylene glycol methyl ether, triethylene glycol ethyl ether, triethylene glycol butyl ether, and others. "Substantially water soluble" solvents are defined as being infinitely or 100% soluble by weight in water at 25° C. "Substantially water insoluble" glycol ether solvents include propylene glycol butyl ether, dipropylene glycol butyl ether, dipropylene glycol propyl ether, tripropylene glycol butyl ether, dipropylene glycol dimethyl ether, propylene glycol phenyl ether, ethylene glycol hexyl ether, diethylene glycol hexyl ether, ethylene glycol phenyl ether, diethylene glycol phenyl ether, and others. "Substantially water insoluble" solvents are defined as 53% by weight or less of solvent is soluble in water at 25° C. Preferred solvents are substantially water-soluble solvents.

According to the invention amidine solvents are typically present from about 30 wt-% to about 70 wt-%, or from about 40 wt-% to about 70 wt-%, or from about 50 wt-% to about 65 wt-% in non-aqueous label removing compositions. Additional solvents in combination with the amidine solvents are typically present from about 5 wt-% to about 50 wt-%, or from about 10 wt-% to about 50 wt-%, or from about 20 wt-% to about 40 wt-% in non-aqueous label removing compositions. Without limiting the scope of the invention, the ranges recited are inclusive of the numbers defining the range and include each integer within the defined range.

According to further embodiments of the invention amidine solvents are typically present from about 1 wt-% to about 20 wt-%, or from about 5 wt-% to about 20 wt-%, or from about 7 wt-% to about 15 wt-% in aqueous label removing compositions. Additional solvents in combination with the amidine solvents are typically present from about 0.01 wt-% to about 15 wt-%, or from about 0.1 wt-% to about 15 wt-%, or from about 5 wt-% to about 15 wt-% in aqueous label removing compositions. Water in combination with the amidine and/or additional solvents is typically present from about 5 wt-% to about 90 wt-%, or from about 10 wt-% to about 80 wt-%, or from about 20 wt-% to about 80 wt-% in aqueous label removing compositions. In certain preferred aspects, water in combination with the amidine and/or additional solvents is present from in the amount of less than 70 wt-%. Without limiting the scope of the invention, the ranges recited are inclusive of the numbers defining the range and include each integer within the defined range.

Surfactants

In some embodiments, the label removing compositions of the present invention include a surfactant or combination of surfactants. Additional detergency or cleaning efficacy for the label removing compositions can be obtained from the use of surfactant materials. Various types of surfactants may be formulated into the label removing compositions to enhance the penetration and solubilization of the adhesives according to the invention, but it is believed that primarily efficacy for the adhesive removal according to the invention is obtained from the inclusion of the solvents in the label removing compositions. Further inclusion of wetting surfactants into the label removing compositions provides a mechanism of synergy for micelle formation and removal of soils and/or labels and/or adhesives according to the non-limiting embodiments of the invention.

Surfactants suitable for use with the compositions of the present invention include, but are not limited to, anionic surfactants, nonionic surfactants, amphoteric surfactants and cationic surfactants. Additional disclosure of surfactants suitable for use in the label removal compositions is provided in "Surface Active Agents and Detergents" (Vol. I and II by Schwartz, Perry and Berch), and "Surfactant Encyclopedia" Cosmetics & Toiletries, Vol. 104 (2) 69-71 (1989), each of which are herein incorporated in its entirety. In preferred embodiments, anionic surfactant(s) are included in the label removing composition with the amidine solvents and/or additional solvents. In additional preferred embodiments, nonionic surfactant(s) are included in the label removing composition with the amidine solvents and/or additional solvents. In still further preferred embodiments, nonionic and anionic surfactant(s) are included in the label removing composition with the amidine solvents and/or additional solvents.

In some embodiments of the invention surfactants are typically present from about 0 wt-% to about 50 wt-%, from about 5 wt-% to about 40 wt-%, from about 10 wt-% to about 40 wt-%, from about 10 wt-% to about 35 wt-%, from about 10 wt-% to about 30 wt-%, or from about 15 wt-% to about 30 wt-% in aqueous label removing compositions. In other embodiments of the invention surfactants are typically present from about 0 wt-% to about 50 wt-%, from about 5 wt-% to about 50 wt-%, from about 10 wt-% to about 50 wt-%, from about 5 wt-% to about 40 wt-%, from about 5 wt-% to about 30 wt-%, from about 5 wt-% to about 25 wt-%, from about 10 wt-% to about 25 wt-%, or from about 10 wt-% to about 20 wt-% in non-aqueous label removing compositions. Without limiting the scope of the invention, the ranges recited are inclusive of the numbers defining the range and include each integer within the defined range.

Anionic Surfactants

In some embodiments, the label removing compositions of the present invention include an anionic surfactant. Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents. An exemplary anionic sulfonate surfactant includes alkylbenzenesulfonic acids, including C10-C16 alkylbenzenesulfonic acids.

Anionic carboxylate surfactants suitable for use in the present compositions include carboxylic acids (and salts), such as alkanoic acids (and alkanoates), ester carboxylic acids (e.g. alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

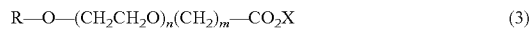

R—O—$(CH_2CH_2O)_n(CH_2)_m$—$CO_2X$     (3)

in which R is a $C_8$ to $C_{22}$ alkyl group or

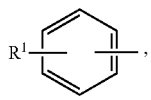

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

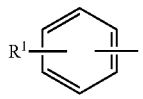

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a C12-13 alkyl polyethoxy (4) carboxylic acid (Shell Chemical), and Emcol® CNP-110, a C9 alkylaryl polyethoxy (10) carboxylic acid (AkzoNobel-Witco Chemical). Carboxylates are also available from Clariant, e.g. the product Sandopan® DTC, a C13 alkyl polyethoxy (7) carboxylic acid.

Nonionic Surfactants

In some embodiments, the label removing compositions of the present invention include a nonionic surfactant. Suitable nonionic surfactants suitable for use with the compositions of the present invention include alkoxylated surfactants. Suitable alkoxylated surfactants include alkoxylated isopropanolamides, EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic® and reverse Pluronic® surfactants; alcohol alkoxylates, such as Dehypon® LS-54 (R-(EO)5(PO)4) and Dehypon® LS-36 (R-(EO)3(PO)6); and capped alcohol alkoxylates, such as Plurafac® LF221 and Tegoten® EC11; mixtures thereof, or the like.

The semi-polar type of nonionic surface active agents are another class of nonionic surfactant useful in compositions of the present invention. Semi-polar nonionic surfactants include the amine oxides, phosphine oxides, sulfoxides and their alkoxylated derivatives.

Amine oxides are tertiary amine oxides corresponding to the general formula:

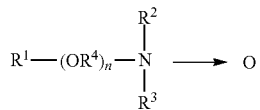

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20. An amine oxide can be generated from the corresponding amine and an oxidizing agent, such as hydrogen peroxide.

Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Additional Functional Ingredients

Any number of optional ingredients may be added to the label removing compositions of the invention. The functional ingredients provide desired properties and functionalities to the label removing composition. For the purpose of this application, the term "functional materials or ingredients" include a material that when dispersed or dissolved in a use and/or concentrate solution, provides a beneficial property in a particular use. The label removing composition may further comprise, consist or consist essentially of a number of other adjuvants, including bottle wash additives, trace compounds, dispersants, anti-redeposition agents, stabilizing agents, dispersants, defoamers, colorants, rinse aids, catalysts, corrosion inhibitors, dyes, fragrances, preservatives and other constituents that may be useful in the invention.

Bottle Washing Additives

In some embodiments, the label removing compositions of the present invention include one or more bottle wash additives. The label removing compositions may optionally be combined with bottle washing additives and/or other detergents. The term "bottle washing additive" and variations thereof, as used herein, refers to surfactants, alkaline and/or acid sources and cleaning agents employed in bottle washing applications. Exemplary bottle washing additives are disclosed, for example, in U.S. Pat. No. 7,148,188 titled "Bottlewash Additive Comprising an Alkyl Diphenylene Oxide Disulfonate," which is herein incorporated by reference in its entirety.

In some aspects, the label removing compositions according to the invention may comprise, consist of and/or consist essentially of an aqueous basic organic solvent and/or an amidine in an amount from about 1 wt-% to about 20 wt-%, water in an amount from about 5 wt-% to about 90 wt-%, and at least one additional functional ingredient, including for example the bottle washing additives in an amount from about 0 wt-% to about 20 wt-%. In some aspects, the label removing compositions according to the invention may comprise, consist of and/or consist essentially of a non-aqueous basic organic solvent and/or an amidine in an amount from about 30 wt-% to about 70 wt-%, and at least one additional functional ingredient, including for example including for example the bottle washing additives in an amount from about 0 wt-% to about 20 wt-%.

Hydrotropes

In some embodiments, the compositions of the present invention can include a hydrotrope. The hydrotrope may be used to aid in maintaining the solubility and/or stability of the label removing compositions according to the invention. Hydrotropes can also be used to modify an aqueous solution creating increased solubility for the solvents, including organic solvents. Any hydrotrope coupler may be used provided it does not react with the other components of the composition or negatively affect the performance properties of the composition. Representative classes of hydrotropic coupling agents or solubilizers which can be employed include anionic surfactants such as alkyl sulfates and alkane sulfonates, linear alkyl benzene or naphthalene sulfonates, secondary alkane sulfonates, alkyl ether sulfates or sulfonates, alkyl phosphates or phosphonates, dialkyl sulfosuccinic acid esters, sugar esters (e.g., sorbitan esters), amine oxides (mono-, di-, or tri-alkyl) and $C_8$-$C_{10}$ alkyl glucosides. Preferred coupling agents for use in the present invention include commonly available aromatic sulfonates such as the alkyl benzene sulfonates (e.g. xylene sulfonates) or naphthalene sulfonates, aryl or alkaryl phosphate esters or their alkoxylated analogues having 1 to about 40 ethylene, propylene or butylene oxide units or mixtures thereof. In some embodiments, hydrotropes are low molecular weight aromatic sulfonate materials such as xylene sulfonates, dialkyldiphenyl oxide sulfonate materials, and the like.

In some aspects, a hydrotrope or combination of hydrotropes can be present in the label removal compositions, preferably the aqueous solvent-based label removing compositions, at an amount of from between about 0 wt % to about 50 wt %, between about 1 wt % to about 25 wt %, between about 5 wt % to about 15 wt %, or between about 5 wt % to about 10 wt %. Without limiting the scope of the invention, the ranges recited are inclusive of the numbers defining the range and include each integer within the defined range.

In some aspects, the label removing compositions according to the invention may comprise, consist of and/or consist essentially of an aqueous basic organic solvent and/or an amidine in an amount from about 1 wt-% to about 20 wt-%, water in an amount from about 5 wt-% to about 90 wt-%, and at least one additional functional ingredient, including for example the hydrotrope or combination of hydrotropes in an amount from about 0 wt-% to about 50 wt-%. In some aspects, the label removing compositions according to the invention may comprise, consist of and/or consist essentially of a non-aqueous basic organic solvent and/or an amidine in an amount from about 30 wt-% to about 70 wt-%, and at least one additional functional ingredient, including for example the hydrotrope or combination of hydrotropes in an amount from about 0 wt-% to about 50 wt-%.

Chelating/Sequestering Agents

In some embodiments, the label removing compositions of the present invention include a chelating and/or sequestering agent. Particularly suitable chelating/sequestering agents useful according to the invention may include, but are not limited to, phosphates, phosphonates, gluconates, and so forth as disclosed in U.S. Pat. No. 7,148,188, which is herein incorporated by reference in its entirety. Phosphates suitable for use herein include, but are not limited to, monomers of phosphoric acid, polymers of phosphoric acid, salts of phosphoric acid or combinations thereof; ortho phosphates, meta phosphates, tripolyphosphates, or combinations thereof; phosphoric acid; alkali metal, ammonium and alkanolammonium salts of polyphosphates (e.g. sodium tripolyphosphate and other higher linear and cyclic polyphosphate species, pyrophosphates, and glassy polymeric meta-phosphates); amino phosphates; nitrilotrismethylene phosphates; and the like; or a combination thereof. Preferred phosphates include phosphoric acid, and monomers, polymers, and salts thereof, and the like, or a combination thereof. Suitable phosphonates include a wide variety of phosphonic acids and phosphonate salts, such as organophosphonates. As used herein, organic phosphonate or organophosphonate refers to organic phosphonates lacking any amino or imino (e.g. nitrogen) moieties. The phosphonic acid or phosphonate can include a low molecular weight phosphonocarboxylic acid such as one having about 2 4 carboxylic acid moieties and about 3 phosphonic acid groups. Some examples of organic phosphonates include 1-hydroxyethane-1,1-diphosphonic acid; $CH_3C(OH)[PO(OH)_2]_2$; 1-phosphono-1-methylsuccinic acid, phosphonosuccinic acid; 2-phosphonobutane-1,2,4-tricarboxylic acid; other similar organic phosphonates; and mixtures thereof. Additional suitable phosphonates include phosphorous acid, $H_3PO_3$, and its salts.

Phosphonic acids can be used in the form of water soluble acid salts, particularly the alkali metal salts, such as sodium or potassium; the ammonium salts; or the alkylol amine salts where the alkylol has 2 to 3 carbon atoms, such as mono-, di-, or triethanolamine salts. Preferred phosphonates include the organic phosphonates. Preferred organic phosphonates include phosphono butane tricarboxylic acid (PBTC) available from Bayer Corp. in Pittsburgh Pa. under the tradename of BAYHIBIT™ AM and hydroxy ethylidene diphosphonic acid (HEDP) such as that sold under the tradename of DEQUEST™ 2010 available from Monsanto Chemical Co. Additional description of suitable phosphate and phosphonate sequestrants suitable for use in the invention is described in U.S. Pat. No. 6,436,893, which is herein incorporated by reference herein in its entirety.

The chelating agents/sequestrants may be employed in the label removing compositions in amounts from about 0.1 wt-% to about 50 wt-%, more suitably about 1 wt-% to about 30 wt-%, still more preferably from about 3 wt-% to about 10 wt-%. Without limiting the scope of the invention, the ranges recited are inclusive of the numbers defining the range and include each integer within the defined range.

In some aspects, the label removing compositions according to the invention may comprise, consist of and/or consist essentially of an aqueous basic organic solvent and/or an amidine in an amount from about 1 wt-% to about 20 wt-%, water in an amount from about 5 wt-% to about 90 wt-%, and at least one additional functional ingredient, including for example the chelating agents/sequestrants in an amount from about 0.1 wt-% to about 50 wt-%. In some aspects, the label removing compositions according to the invention may comprise, consist of and/or consist essentially of a non-aqueous basic organic solvent and/or an amidine in an amount from about 30 wt-% to about 70 wt-%, and at least one additional functional ingredient, including for example the chelating agents/sequestrants in an amount from about 0.1 wt-% to about 50 wt-%.

Defoaming Agents

In some embodiments, the label removing compositions of the present invention include a defoaming agent. Particularly suitable defoamers may be employed in combination with surfactants and/or sequestrants. Wetting agents which can be used in the composition of the invention include any of those constituents known within the art to raise the surface activity of the composition of the invention. Generally, defoamers which can be used in accordance with the invention include silica and silicones; aliphatic acids or esters; alcohols; sulfates or sulfonates; amines or amides; halogenated compounds such as fluorochlorohydrocarbons; vegetable oils, waxes, mineral oils as well as their sulfonated or sulfated derivatives; fatty acids and/or their soaps such as alkali, alkaline earth metal soaps; and phosphates and phosphate esters such as alkyl and alkaline diphosphates, and tributyl phosphates among others; and mixtures thereof.

In some embodiments, the label removing compositions include antifoaming agents or defoamers which are of food grade quality given the application of the method of the invention. To this end, one of the more effective antifoaming agents includes silicones. Silicones such as dimethyl silicone, glycol polysiloxane, methylphenol polysiloxane, trialkyl or tetralkyl silanes, hydrophobic silica defoamers and mixtures thereof can all be used in defoaming applications. Commercial defoamers commonly available include silicones such as Ardefoam® from Armour Industrial Chemical Company which is a silicone bound in an organic emulsion; Foam Kill® or Kresseo® available from Krusable Chemical Company which are silicone and non-silicone type defoamers as well as silicone esters; and Anti-Foam A® and DC-200 from Dow Corning Corporation which are both food grade type silicones among others. In one embodiment, the defoamer is a block copolymer of polyoxyethylene/polyoxypropylene.

Additional descriptions of suitable defoaming agents may be found, for example, in U.S. Pat. Nos. 3,048,548, 3,334,147 and 3,442,242, the disclosures of which are incorporated by reference herein.

In some aspects, the label removing compositions according to the invention may comprise, consist of and/or consist essentially of an aqueous basic organic solvent and/or an amidine in an amount from about 1 wt-% to about 20 wt-%, water in an amount from about 5 wt-% to about 90 wt-%, and at least one additional functional ingredient, including for example the defoaming agents in an amount from about 0 wt-% to about 20 wt-%. In some aspects, the label removing compositions according to the invention may comprise, consist of and/or consist essentially of a non-aqueous basic organic solvent and/or an amidine in an amount from about 30 wt-% to about 70 wt-%, and at least one additional functional ingredient, including for example including for example the defoaming agents in an amount from about 0 wt-% to about 20 wt-%.

Rinse Aids

In some embodiments, the label removing compositions of the present invention include a rinse aid to improve water drainage/removal from treated surfaces and/or improve drying of the surface. Generally, rinse aid formulations contain a wetting or sheeting agent combined with other optional ingredients. The rinse aids are capable of reducing the surface tension of the rinse water to promote sheeting action and/or to prevent spotting or streaking caused by beaded water after rinsing is complete. Examples of sheeting agents include, but are not limited to: polyether compounds prepared from ethylene oxide, propylene oxide, or a mixture in a homopolymer or block or heteric copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule. Various additional suitable rinse aids are disclosed for example in U.S. patent application Ser. Nos. 12/706,143 and 13/101,295, which are herein incorporated by reference in their entirety.

In some aspects, the label removing compositions according to the invention may comprise, consist of and/or consist essentially of an aqueous basic organic solvent and/or an amidine in an amount from about 1 wt-% to about 20 wt-%, water in an amount from about 5 wt-% to about 90 wt-%, and at least one additional functional ingredient, including for example the rinse aids in an amount from about 0 wt-% to about 20 wt-%. In some aspects, the label removing compositions according to the invention may comprise, consist of and/or consist essentially of a non-aqueous basic organic solvent and/or an amidine in an amount from about 30 wt-% to about 70 wt-%, and at least one additional functional ingredient, including for example including for example the rinse aids in an amount from about 0 wt-% to about 20 wt-%.

Corrosion Inhibitors

In some embodiments, the label removing compositions of the present invention include a corrosion inhibitor. Exemplary corrosion inhibitors suitable for use according to the invention are disclosed, for example, in U.S. Ser. No. 13/548,367 and U.S. Pat. Nos. 8,343,380, 8,207,102, 8,114,344, 8,114,343, 8,105,531, 8,021,493, 7,960,329, 7,919,448, 7,829,516, 7,828,908, 7,741,262, 7,709,434, 7,196,045, 7,196,044, and 6,835,702, each of where are herein incorporated by reference in their entirety.

In some aspects, the label removing compositions according to the invention may comprise, consist of and/or consist essentially of an aqueous basic organic solvent and/or an amidine in an amount from about 1 wt-% to about 20 wt-%, water in an amount from about 5 wt-% to about 90 wt-%, and at least one additional functional ingredient, including for example the corrosion inhibitors in an amount from about 0 wt-% to about 20 wt-%. In some aspects, the label removing compositions according to the invention may comprise, consist of and/or consist essentially of a non-aqueous basic organic solvent and/or an amidine in an amount from about 30 wt-% to about 70 wt-%, and at least one additional functional ingredient, including for example including for example corrosion inhibitors in an amount from about 0 wt-% to about 20 wt-%.

Catalysts

In some embodiments, the label removing compositions of the present invention include a catalyst. Catalysts may be provided in various forms, including for example metallic manganese, silver, and/or vanadium. In an aspect of the invention, a catalyst preferably includes at least one source of manganese. In some embodiments, the manganese source is derived from manganese metal, manganese oxides, colloidal manganese, inorganic or organic complexes of manganese, including manganese sulfate, manganese carbonate, manganese acetate, manganese lactate, manganese nitrate, manganese gluconate, manganese chloride or commercially available as Dragon A350 (also known as Dragon's Blood, available from Rahu Catalytics of Nottingham, U.K.), or any of the salts of salt forming species with manganese.

According to an embodiment, the catalyst includes at least one source of silver. In some embodiments, the silver source is derived from silver metal, silver oxides, silver hydroxide, colloidal silver, inorganic or organic complexes of silver, water-soluble or insoluble silver salts, including silver sulfate, silver carbonate, silver acetate, silver lactate, silver nitrate, silver gluconate, or silver chloride, or any of the salts of or salt forming species with silver. According to a still further embodiment, the catalyst includes at least one source of vanadium.

Additional description of catalysts which may be suitable for use according to the invention are provided in U.S. application Ser. No. 12/887,755, the entirety of which application is herein incorporated by reference.

In some aspects, the label removing compositions according to the invention may comprise, consist of and/or consist essentially of an aqueous basic organic solvent and/or an amidine in an amount from about 1 wt-% to about 20 wt-%, water in an amount from about 5 wt-% to about 90 wt-%, and at least one additional functional ingredient, including for example the catalyst in an amount from about 0 wt-% to about 20 wt-%. In some aspects, the label removing compositions according to the invention may comprise, consist of and/or consist essentially of a non-aqueous basic organic solvent and/or an amidine in an amount from about 30 wt-% to about 70 wt-%, and at least one additional functional ingredient, including for example including for example catalyst in an amount from about 0 wt-% to about 20 wt-%.

Exemplary Non-Aqueous Solvent-Based Compositions

In some aspects, the label removing compositions according to the invention may comprise, consist of and/or consist essentially of a non-aqueous basic organic solvent and/or an amidine in an amount from about 30 wt-% to about 70 wt-%, an additional solvent in an amount from about 0 wt-% to about 50 wt-%, one or more surfactants in an amount from about 0 wt-% to about 50 wt-%, sodium hydroxide in an amount from about 0 wt-% to about 2 wt-%, and at least one additional functional ingredient selected from the group consisting of: bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

In some aspects, the label removing compositions according to the invention may comprise, consist of and/or consist essentially of a non-aqueous basic organic solvent and/or an amidine in an amount from about 30 wt-% to about 70 wt-%, an additional solvent in an amount from about 0 wt-% to about 50 wt-%, one or more surfactants in an amount from about 0 wt-% to about 50 wt-%, sodium hydroxide in an amount from about 0 wt-% to about 2 wt-%, and at least two additional functional ingredients selected from the group consisting: of bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

In some aspects, the label removing compositions according to the invention may comprise, consist of and/or consist essentially of a non-aqueous basic organic solvent and/or an amidine in an amount from about 30 wt-% to about 70 wt-%, an additional solvent in an amount from about 0 wt-% to about 50 wt-%, one or more surfactants in an amount from about 0 wt-% to about 50 wt-%, sodium hydroxide in an amount from about 0 wt-% to about 2 wt-%, and at least three additional functional ingredients selected from the group consisting of: bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

In some aspects, the label removing compositions according to the invention may comprise, consist of and/or consist essentially of a non-aqueous basic organic solvent and/or an amidine in an amount from about 30 wt-% to about 70 wt-%, an additional solvent in an amount from about 0 wt-% to about 50 wt-%, one or more surfactants in an amount from about 0 wt-% to about 50 wt-%, sodium hydroxide in an amount from about 0 wt-% to about 2 wt-%, and at least four additional functional ingredients selected from the group consisting of: bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

In some aspects, the label removing compositions according to the invention may comprise, consist of and/or consist essentially of a non-aqueous basic organic solvent and/or an amidine in an amount from about 30 wt-% to about 70 wt-%, an additional solvent in an amount from about 0 wt-% to about 50 wt-%, one or more surfactants in an amount from about 0 wt-% to about 50 wt-%, sodium hydroxide in an amount from about 0 wt-% to about 2 wt-%, and at least five additional functional ingredients selected from the group consisting of: bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

In some aspects, the label removing compositions according to the invention may comprise, consist of and/or consist essentially of a non-aqueous basic organic solvent and/or an amidine in an amount from about 30 wt-% to about 70 wt-%, an additional solvent in an amount from about 0 wt-% to about 50 wt-%, one or more surfactants in an amount from about 0 wt-% to about 50 wt-%, sodium hydroxide in an amount from about 0 wt-% to about 2 wt-%, and at least six additional functional ingredients selected from the group consisting of: bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

In some aspects, the label removing compositions according to the invention may comprise, consist of and/or consist essentially of a non-aqueous basic organic solvent and/or an amidine in an amount from about 30 wt-% to about 70 wt-%, an additional solvent in an amount from about 0 wt-% to about 50 wt-%, one or more surfactants in an amount from about 0 wt-% to about 50 wt-%, sodium hydroxide in an amount from about 0 wt-% to about 2 wt-%, and each of the following additional functional ingredients, including bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

Exemplary Aqueous Solvent-Based Compositions

In some aspects, the label removing compositions according to the invention may comprise, consist of and/or consist essentially of an aqueous basic organic solvent and/or an amidine in an amount from about 1 wt-% to about 20 wt-%, an additional solvent in an amount from about 0 wt-% to about 15 wt-%, water in an amount from about 5 wt-% to about 90 wt-%, one or more surfactants in an amount from about 0 wt-% to about 50 wt-%, sodium hydroxide in an amount from about 0 wt-% to about 2 wt-%, and at least one additional functional ingredient selected from the group consisting of: bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

In some aspects, the label removing compositions according to the invention may comprise, consist of and/or consist essentially of an aqueous basic organic solvent and/or an amidine in an amount from about 1 wt-% to about 20 wt-%, an additional solvent in an amount from about 0 wt-% to about 15 wt-%, water in an amount from about 5 wt-% to about 90 wt-%, one or more surfactants in an amount from about 0 wt-% to about 50 wt-%, sodium hydroxide in an amount from about 0 wt-% to about 2 wt-%, and at least two additional functional ingredients selected from the group consisting of: bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

In some aspects, the label removing compositions according to the invention may comprise, consist of and/or consist essentially of an aqueous basic organic solvent and/or an amidine in an amount from about 1 wt-% to about 20 wt-%, an additional solvent in an amount from about 0 wt-% to about 15 wt-%, water in an amount from about 5 wt-% to about 90 wt-%, one or more surfactants in an amount from about 0 wt-% to about 50 wt-%, sodium hydroxide in an amount from about 0 wt-% to about 2 wt-%, and at least three additional functional ingredients selected from the group consisting of: bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

In some aspects, the label removing compositions according to the invention may comprise, consist of and/or consist essentially of an aqueous basic organic solvent and/or an amidine in an amount from about 1 wt-% to about 20 wt-%, an additional solvent in an amount from about 0 wt-% to about 15 wt-%, water in an amount from about 5 wt-% to about 90 wt-%, one or more surfactants in an amount from about 0 wt-% to about 50 wt-%, sodium hydroxide in an amount from about 0 wt-% to about 2 wt-%, and at least four additional functional ingredients selected from the group consisting of: bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

In some aspects, the label removing compositions according to the invention may comprise, consist of and/or consist essentially of an aqueous basic organic solvent and/or an amidine in an amount from about 1 wt-% to about 20 wt-%, an additional solvent in an amount from about 0 wt-% to about 15 wt-%, water in an amount from about 5 wt-% to about 90 wt-%, one or more surfactants in an amount from about 0 wt-% to about 50 wt-%, sodium hydroxide in an amount from about 0 wt-% to about 2 wt-%, and at least five additional functional ingredients selected from the group consisting of: bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

In some aspects, the label removing compositions according to the invention may comprise, consist of and/or consist essentially of an aqueous basic organic solvent and/or an amidine in an amount from about 1 wt-% to about 20 wt-%, an additional solvent in an amount from about 0 wt-% to about 15 wt-%, water in an amount from about 5 wt-% to about 90 wt-%, one or more surfactants in an amount from about 0 wt-% to about 50 wt-%, sodium hydroxide in an amount from about 0 wt-% to about 2 wt-%, and at least six additional functional ingredients selected from the group consisting of: bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

In some aspects, the label removing compositions according to the invention may comprise, consist of and/or consist essentially of an aqueous basic organic solvent and/or an amidine in an amount from about 1 wt-% to about 20 wt-%, an additional solvent in an amount from about 0 wt-% to about 15 wt-%, water in an amount from about 5 wt-% to about 90 wt-%, one or more surfactants in an amount from about 0 wt-% to about 50 wt-%, sodium hydroxide in an amount from about 0 wt-% to about 2 wt-%, and each of the following additional functional ingredients, including bottle washing additive(s) in an amount from about 1 wt-% to about 20 wt-%, hydrotrope(s) in an amount from about 1 wt-% to about 50 wt-%, chelating agent(s)/sequestrant(s) in an amount from about 0.1 wt-% to about 50 wt-%, defoaming agent(s) in an amount from about 0.1 wt-% to about 20 wt-%, rinse aid(s) in an amount from about 0.1 wt-% to about 20 wt-%, corrosion inhibitor(s) in an amount from about 0 wt-% to about 20 wt-%, and catalyst(s) in an amount from about 0.1 wt-% to about 20 wt-%.

Composition Formulations

Compositions for removal of soils, adhesives or synthetic glue residues from a surface are provided according to the invention. The label removing compositions of the present invention may be of any suitable form, including liquid, solid (such as tablets, powder/granules), paste, foam or gel, with powders and tablets. Liquid solutions are preferred according to the invention and methods of employing the label removing compositions. The composition may be in the form of a unit dose product, i.e. a form which is designed to be used as a single portion of label removing composition in a washing operation. Of course, one or more of such single portions may be used in a cleaning operation.

The label removing compositions according to the invention may be provided in the form of a concentrated composition or a ready to use composition. The concentrated composition can be referred to more simply as the concentrate, and can be diluted to provide a ready to use label removing composition. The ready to use composition can be referred to as the use composition when it is the composition to be directly applied to a surface in need of treatment according to the invention. As one skilled in the art will ascertain the label removing composition can be provided as a concentrate for purposes of shipment and the economy of providing label removing compositions in concentrate formulations. The concentrate is diluted with water available at the locale or site of dilution. Both concentrated and diluted ready to use label removing compositions are encompassed by the present invention.

The label removing compositions of the invention may be made by any suitable method depending upon their format. Suitable manufacturing methods for the label removing compositions are well known in the art.

Methods of Cleaning and Label Removal

Methods of cleaning employing the label removing compositions of the invention are included in the scope of the invention. Use of the label removing compositions are particularly suitable for various bottle washing applications, including label removal. Beneficially, the methods of the invention provide efficient and effective label removal, while reducing the overall cost of the chemical compositions, reducing the temperature and caustic conditions and/or mechanical effects required for the label removal and cleaning of the article.

Methods according to the invention may comprise, consist of and/or consist essentially of applying a label removing composition to a surface in need of adhesive removal and/or cleaning. The methods may further comprise the removal of an adhesive label from the treated surface.

A variety of hard surfaces may be treated with the compositions according to the invention, including for example, glass, metal and plastics, including polycarbonates, polyvinyl chloride, polyesters such as polyethylene terephthalate (commonly abbreviated PET or PETE), polyethylene naphthenate, polyethylene and other thermoplastic polymers, such as those compatible for use in beverage and food containers. Plastic containers may be made from any number of materials depending on the application, including for example, polyethylene terephthalate. In a preferred aspect, glass surfaces are the preferred treated surface for removal of adhesives and labels.

Surfaces treated according to the invention include a variety of containers that may be adapted in shape to a variety of applications. As described herein, the invention refers primarily to bottles and the cleaning of bottles, although a variety of additional containers may be treated according to the present invention and are encompassed within the scope of the invention.

A variety of labels may be removed according to the methods of the invention. Suitable labels include any adhesive-based label. Adhesive-based labels include for example both paper and metalized labels (e.g. aluminum), such as those employed on commercially-available returnable glass bottles. Adhesive-based labels may include synthetic and/or natural adhesives. An example of a synthetic adhesive is a polyacrylic acid adhesives or polymers of a polycarboxylate. An example of a natural adhesive is casein or melamine casein. In a preferred aspect, metal- or foil-based labels are particularly suited for removal according to the methods and compositions of the invention. Metal- or foil-based based labels are difficult to remove in comparison to paper-based labels as they are difficult to penetrate by a label removing composition. Beneficially, methods and compositions of the invention provide effective label coating and label penetration.

In an aspect of the invention, the methods are particularly suited for the removal of labels, including those that are adhesively applied and have been exposed to the sun. Adhesively applied labels, after sun exposure, can be extremely difficult to remove. Beneficially, the step of removing the label from the treated bottle or surface does not include the destruction of the label itself.

In an aspect of the invention, the removal of a label includes a step of forming a layer of the label removing composition over the label and thereafter penetrating the label to effectuate removal of the label. Without being limited to a particular theory of the invention, the solvents of the label removing composition act to solubilize the adhesive holding of the label to the surface and/or may penetrate the label from the outside (e.g. top of the label) to create micropores in the label in order to penetrate the label and thereafter solubilize the adhesive component of the label. In a further aspect of the invention, the methods include the destabilization of the adhesive layer of a label.

In a further aspect, the label itself that is removed according to the methods of the invention does not dissolve and/or pulp. As a result of the label being removed intact it is easily retrievable from a wash source. Beneficially, as the label does not dissolve and/or pulp the label removing composition in the wash solution can be used for an extended period of time in order to minimize waste sources. In a preferred aspect of the invention, the label itself that is removed further retains the adhesive.

According to an embodiment of the invention, a label removing composition comprising an aqueous or non-aqueous basic organic solvent and/or an amidine is applied to a surface in need of label removal and/or cleaning. The compositions may also include a chelant, acidulant, additional solvents, surfactants and/or other functional ingredients as set forth herein the description of the invention. Compositions of the invention for label removing may be provided as a ready-to-use (RTU) solution or as a concentrate for diluting to prepare a use solution.

A use solution may be prepared from a concentrate by diluting the concentrate with water at a dilution ratio that provides a use solution having desired label-removing and adhesive-removing properties. The typical dilution factor is between approximately 1 and approximately 10,000 but will depend on factors including the amount and types of adhesives to be removed, temperatures and the like. In an embodiment, the concentrate is diluted at a ratio of between about 1:5 and about 1:1,000 concentrate to water. Particularly, the concentrate is diluted at a ratio of between about 1:5 and about 1:100 concentrate to water.

In some aspects, the label removing composition is provided in an aqueous solution in the amounts of from approximately 0.01 wt-% to about 50 wt-%, preferably from about 0.1 wt-% to about 30 wt-%, more preferably from about 0.6 wt-% to about 10 wt-%. One skilled in the art may further vary the amount of the concentrated label removing compositions according to the invention, depending on the initial concentration of the starting, concentrated label removing composition and the desired applications of use thereof. Without limiting the scope of the invention, the ranges recited are inclusive of the numbers defining the range and include each integer within the defined range.

According to an embodiment of the invention, the methods of cleaning include applying the label removing composition under an alkaline pH range within a label removal process and/or bottle cleaning process. For example, the alkaline pH may be from about 9 to about 14, preferably from about 10 to about 14, and more preferably from about 12 to about 14, e.g., 9-10, 9-11, 9-12, 9-13, 9-14, 10-11, 10-12, 10-13, 10-14, 11-12, 11-13, 11-14, 12-13-, 12-14, or 13-14. Without limiting the scope of the invention, the ranges recited are inclusive of the numbers defining the range and include each integer within the defined range. In an aspect of the invention it is unexpected for the label removing compositions to remove adhesive labels according to the methods at the alkaline pH without employing and/or reducing the amount of a caustic-based composition and/or requiring high temperatures. As one skilled in the art will ascertain, adhesive label removal is conventionally achieved only at alkaline pH using caustic solutions.

According to the methods of using the label removing compositions, the label removing compositions suitable for use under any suitable conditions or temperature. In an aspect, the label removal takes place under lower temperature conditions in comparison to conventional label removal methods. For example, the methods may include use of the label removing composition at temperatures below the conventional temperature range for glass label removal and/or cleaning, which is about 85° C. In some embodiments, the label removing compositions are configured to be contacted with surface (such as a bottle) in need of label and/or adhesive removal at a temperature ranging from about 30° C. to about 60° C., about 35° C. to about 60° C., about 40° C. to about 60° C., about 45° C. to about 60° C., about 50° C. to about 60° C., or about 55° C. to about 60° C., e.g., about 30° C.-35° C., 35° C.-40° C., 40° C.-45° C., 45° C.-50° C., 50° C.-55° C., 55° C.-60° C., or any ranges there between. Without limiting the scope of the invention, the ranges recited are inclusive of the numbers defining the range and include each integer within the defined range.

Beneficially the methods of cleaning according to the invention to remove bottle labels do not require any increase in time over conventional bottle removal methods. Unexpectedly, despite the use of lower temperatures and non-caustic and/or reduced caustic concentrations of cleaning components, the methods of label removal do not require increased time. In some aspects, the methods of the invention achieve complete label removal in less time that conventional bottle removal methods employing higher temperature and/or more caustic label removing compositions. Without being limited to a particular theory of the invention, the label removing compositions provided faster penetration of the label and glue solubilization. For example, the label removing compositions provide removal within a period of time of less than about 30 minutes, or preferably within less than about 15 minutes, e.g., less than about 30 minutes, 25 minutes, 20 minutes, 15 minutes, 10 minutes, or 5 minutes or less. In other aspects, the label removing compositions provide removal within a period of time of less than about 2 hours, or preferably within less than about 60 minutes, e.g., less than about 2 hours, 1 hour, 60 minutes, 50 minutes, 45 minutes, 40 minutes, 35 minutes, 30 minutes, 25 minutes, 20 minutes, 15 minutes, 10 minutes, or 5 minutes or less.

The methods of label removal according to the invention employing the label removing compositions may be applied after caustic washing tanks, after any down-line equipment in a bottle washing process (e.g. pasteurizer), washing section or any other area. Preferably, the label removing composition is applied to a bottle washer wash tank, preferably in a use solution of a weak caustic. According to an alternative embodiment of the invention, the methods of cleaning include applying the label removing composition to a bottle filling line, a tunnel pasteurizer's water and/or in a rinse section of bottle washer.

The methods of application of the label removing compositions may include manual application, application using a hand operated cleaning equipment, and/or in automatic cleaning equipment with or without the assistance of mechanical action.

As one skilled in the art will ascertain, in institutional settings the machines most often used to convey bottles through an automatic cleaning process include various zones, such as pre-rinse or soak, rinse, cleaning, and final rinse.

The methods of the invention may be practiced with low pressure, no contact cleaning methods, high pressure scrubbing application of the label removing compositions, friction wash with low or high pressure fluid application, presoak cleaning in 'touchless' and friction-type washes, clean-in-place (closed environment) washing systems, or any variation of cleaning formats known within the art.

All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The materials used in the following Examples are provided herein: Various commercially-available stock solutions were employed in formulations (available from various sources) including: sodium xylene sulfonate (40%).

DBU: 1,8-Diazabicyclo[5.4.0]undec-7-ene, belongs to the class of amidine compounds and is used in organic synthesis as a catalyst, a complexing ligand, and a non-nucleophilic base available from Air Products and Chemicals, Inc. (Allentown, Pa.).

Steposol MET-10U: N,N-Dimethyl-9-Decenamide, is a nonionic solvent surfactant available from Stepan Company (Northfield, Ill.).

Makon NF-5: Oxirane, 2-Methyl-, Polymer with Oxirane Mono[2-[(oxooctyl)amion]methyl and Monoisopropanol-amide alkoxylate, is a nonionic surfactant available from Stepan Company (Northfield, Ill.).

BIO-SOFT S-101: Alkylbenzenesulfonic Acid (C10-C16), is a biodegradable surfactant intermediate available from Stepan Company (Northfield, Ill.).

D-Limonene: Cyclic Terpene, is a biodegradable cleaning solvent available from Orica Australia Pty Ltd. (Melbourne, Australia).

Example 1

Various experimental solvent formulations were analyzed for their capability to coat and penetrate foil coated labels used in commercial glass bottling. Formulas 31-1, 31-2, 31-3, and 31-5 were prepared to be analyzed. Specifically, Cristal labels were placed in 40 mL vials and allowed to soak in the experimental formulations provided in Tables 3A and 3B. Exposure of the foil labels to the experimental formulations were maintained at room temperature with occasional agitation/shaking by hand. The labels were visually analyzed over a 2 hour time period to determine the efficacy of each experimental formulation to dissolve the label coatings.

TABLE 3A

| Component | Formula 31-1 Wt., gr. | Formula 31-1 Wt. % | Formula 31-2 Wt., gr. | Formula 31-2 Wt. % | Formula 31-3 Wt., gr. | Formula 31-3 Wt. % |
|---|---|---|---|---|---|---|
| Water Zeolite Softened TNK | | | | | | |
| DBU (1,8-Diazabicyclo[5.4.0]undec-7-ene) | 15.91 | 64.97 | 14.59 | 58.43 | 15.00 | 58.87 |
| Steposol MET-10U | 4.04 | 16.50 | 5.04 | 20.18 | 5.04 | 19.78 |
| D-Limonene | 2.03 | 8.29 | 2.52 | 10.09 | | |
| Makon NF-5 | 2.01 | 8.21 | 2.54 | 10.17 | 5.08 | 19.94 |
| BIO-SOFT S-101 | 0.50 | 2.04 | 0.28 | 1.12 | 0.36 | 1.41 |
| Total | 24.5 | 100.00 | 24.97 | 100.00 | 25.48 | 100.00 |
| | pH 12-14 | | pH 12-14 | | pH 12-14 | |

TABLE 3B

| Component | Formula 31-4 Wt., gr. | Formula 31-4 Wt. % | Formula 31-5 Wt., gr. | Formula 31-5 Wt. % | Formula 31-6 Wt., gr. | Formula 31-6 Wt. % |
|---|---|---|---|---|---|---|
| Water Zeolite Softened TNK | 8.14 | 79.34 | 140.07 | 69.75 | 350.06 | 70.14 |
| Sodium Xylene Sulfonate, 40% | | | 20.35 | 10.13 | 50.00 | 10.02 |
| DBU (1,8-Diazabicyclo[5.4.0]undec-7-ene) | 1.02 | 9.94 | 20.89 | 10.40 | 50.04 | 10.03 |
| Steposol MET-10U | | | 10.02 | 4.99 | 25.06 | 5.02 |
| D-Limonene | | | | | | |
| Makon NF-5 | 1.10 | 10.72 | 6.46 | 3.22 | 16.32 | 3.27 |
| BIO-SOFT S-101 | | | 3.02 | 1.50 | 7.59 | 1.52 |
| Total | 10.3 | 100.00 | 200.81 | 100.00 | 499.07 | 100.00 |
| | pH 12-14 | | pH 12-14 | | pH 12-14 | |

The experimental formulas tested were effective at coating and penetrating the foil coated labels, and dissolving that label coatings as can be seen compared to the untreated label (FIG. 1A, center). The tested formulas began to remove the coatings within 15 minutes, with most of the coating removed within 2 hours. As can be seen in FIG. 1A both the non-aqueous solvents (31-1, 31-2, and 31-3) and aqueous solvents (31-5) displayed a better than expected performance in removing the label coatings. In particular, formula 31-5 (FIG. 1A, lower right), which contains almost 70% water, showed great potential in removing the coating and was somewhat less aggressive than formulas 31-1 to 31-3. Specifically, formula 31-1 was the most aggressive in removing the entire coating on the label, followed by 31-2, 31-3 and 31-5, respectively (FIG. 1A). This better than expected performance is attributable to the presence of the organic base, DBU (1,8-Diazabicyclo[5.4.0]undec-7-ene).

Figure 1B:
FIG. 1B shows Heineken Beer Bottle Labels treated with Experimental formula 31-5 according to embodiments of the invention.
Figure 1C:
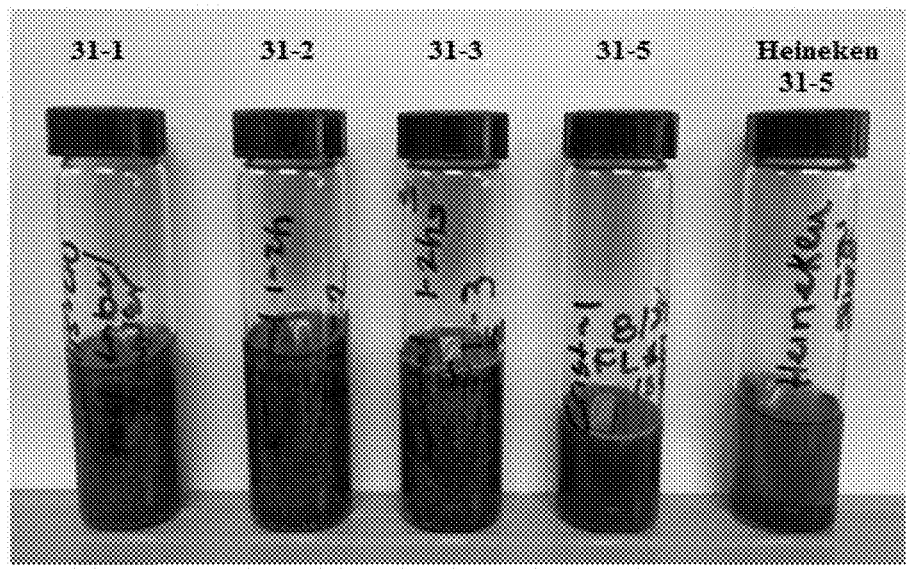
FIG. 1C shows solutions after evaluating CRISTAL and Heineken Beer Bottle Labels, with Experimental formulas 31-1 to 31-3 and 31-5, left to right, respective, according to embodiments of the invention.

The aqueous solvent formulation, 31-5 was further tested for its ability to coat and penetrate additional foil coated labels. This experiment was performed as described above, with the exception that two labels, foil coated Heineken labels, were added to the same 40 mL vial simultaneously. As can be seen in FIG. 1B (right), the foil coating was easily removed by formula 31-5, compared to the untreated label (FIG. 1B, left). FIG. 1C shows the residual experimental formulas after evaluating the Cristal and Heineken bottle labels experiments described above. As can be seen in FIG. 1C residual ink and the remaining foil-based coating particles are observed to be dissolved within the remaining solvents. The results from the above experiments show the tested formulas to be efficient in penetrating and removing the foil coating on labels, such as those used for labeling glass bottles.

Example 2

Additional experimental solvent formulas were tested for their ability to remove foil labels and adhesive material from the necks of glass bottles. Formulas 42-1 and 42-2 were prepared to be analyzed. Formula 42-1 was a remake of 31-6 and compositionally similar to 31-5, shown above. Formula 42-2 is a modification of 42-1 with the inclusion of an anti-redeposition agent. Both solutions were used neat without caustic. For these experiments 120 mL of experimental solution was placed into a beaker and used to soak labeled glass bottles over time. In detail, Beck's beer bottles were inverted and placed into beakers containing DBU based formulas 42-1 or 42-2 (Table 4), allowing the neck foil label and adhesive material to soak, as can be seen in FIG. 2B. Testing was conducted at 45° C. (113° F.) and bottles were removed from the solution after 60 minutes. Visual evaluations were conducted over the 60 minute timeframe analyzing the efficiency of each solution to penetrate and remove the labels and adhesive material. After 60 minutes the bottles were removed from the solutions and rinsed under a slow stream of tap water.

TABLE 4

| Component | Formula 42-1 Wt., gr. | Formula 42-1 Wt. % | Formula 42-2 Wt., gr. | Formula 42-2 Wt. % |
|---|---|---|---|---|
| Water Zeolite Softened TNK | 350.1 | 70.14 | 350.04 | 70.03 |
| Sodium Xylene Sulfonate, 40% | 50.04 | 10.02 | 50.05 | 10.01 |
| DBU (1,8-Diazabicyclo[5.4.0]undec-7-ene) | 50.02 | 10.02 | 40.03 | 8.01 |
| Steposol MET-10U | 25.05 | 5.02 | 20.21 | 4.04 |
| Makon NF-5 | 16.35 | 3.28 | 16.54 | 3.31 |

TABLE 4-continued

|  | Formula 42-1 | | Formula 42-2 | |
| --- | --- | --- | --- | --- |
| Component | Wt., gr. | Wt. % | Wt., gr. | Wt. % |
| BIO-SOFT S-101 | 7.61 | 1.52 | 7.68 | 1.54 |
| PVP K-14 (Anti-redeposition Agent) |  |  | 15.26 | 3.05 |
| Total | 499.17 | 100.00 | 499.81 | 100.00 |
|  | pH 12-14 | | pH 12-14 | |

Figure 2C:
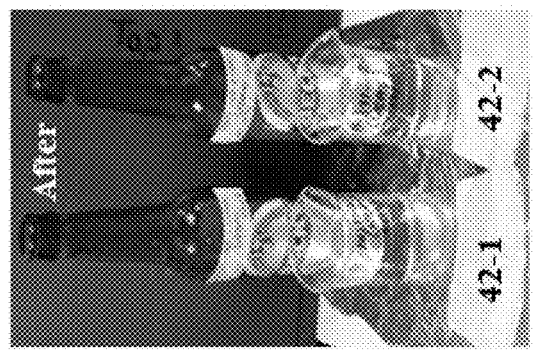
FIGS. 2A-2C show Beck's Beer bottles before (FIG. 2A), during (FIG. 2B) and after (FIG. 2C) soaking in Experimental formulas 42-1 and 42-2 according to embodiments of the invention.
Figure 2B:
Figure 2A:
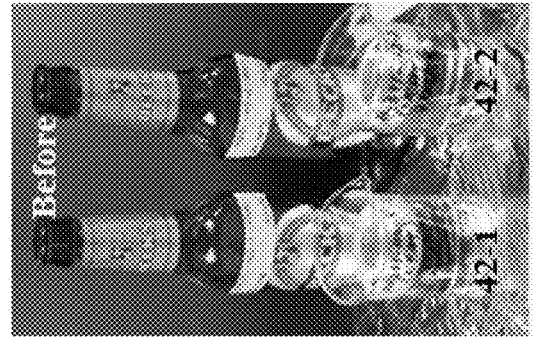

As can be seen in FIG. 2C, both experimental solutions were efficient in removing the neck foil label and adhesive material from the glass bottles. The labels began separating at the seam/overlap in about 5 minutes and the neck foil label's coating was removed within 30 minutes. Both labels were easily rinsed away with residual glue/adhesive still present on the bottles. The remaining adhesive was soft enough that it could be wiped away.

Figure 3C:
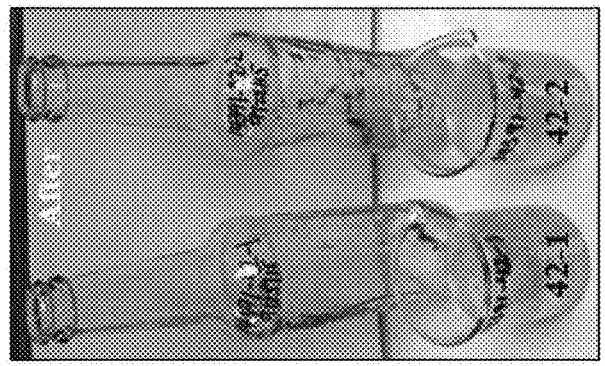
FIGS. 3A-3C show Brahva bottles before (FIG. 3A), during (FIG. 3B) and after (FIG. 3C) soaking in Experimental formulas 42-1 and 42-2 according to embodiments of the invention.
Figure 3B:
Figure 3A:
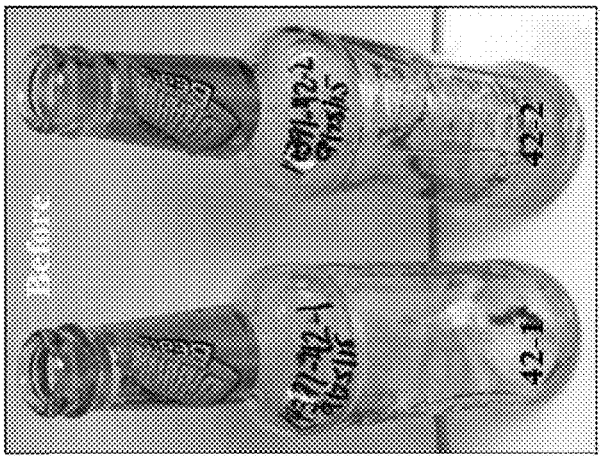
Figure 4D:
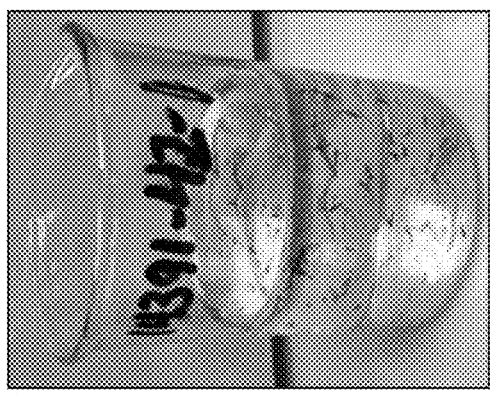
FIGS. 4A-4D show Coors Light Beer bottles before (FIG. 4A), during (FIG. 4B) and after (FIG. 4C-4D) soaking in Experimental formula 42-1 according to embodiments of the invention.
Figure 4C:
Figure 4B:
Figure 4A:
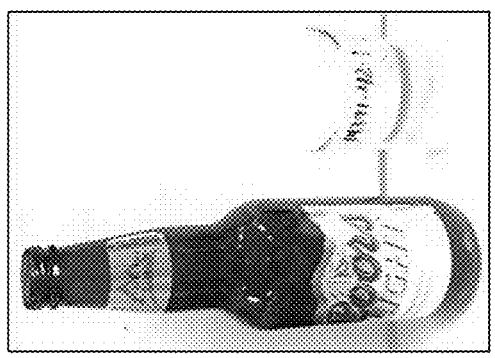
Figure 5A:
FIG. 5A shows a comparison of bottles before and after soaking in Experimental formula 42-2 (left & right respectively).
Figure 5B:
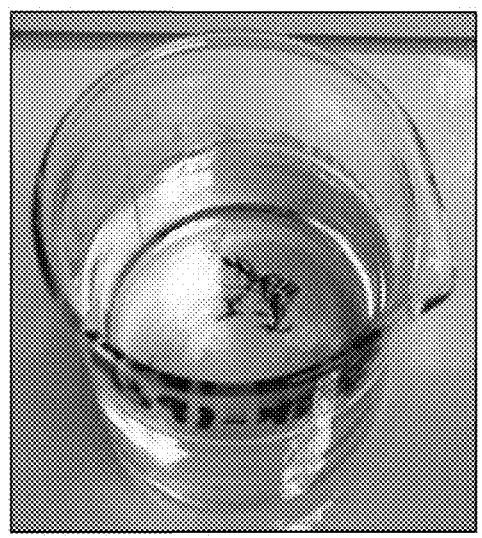
FIG. 5B shows a close-up view of Experimental formula 42-2 following the foil label removal experiment set forth in Example 2 and according to embodiments of the invention.

Further experiments were conducted with formulas 42-1 and 42-2, using the same procedure described above except, for these experiments Brahva Beats labeled bottles were allowed to soak for 10 minutes at 50-60° C. (122-140° F.). The results of these experiments can be seen in FIGS. 3A-3C. As can be seen in FIG. 3C, both labels easily separated from the bottle with no visible sign of adhesive on the bottles. Additionally, Coors Light labeled bottles were soaked at 50-60° C. (122-140° F.) with formula 42-1. The experimental procedure and results are shown in FIGS. 4A-4D. Consistent with the results shown in FIG. 3C, formula 42-1 showed to be an effective solvent solution as the ink and laminated coating began to come off at ca. 1.25 minutes and the label was removed in 4.75 minutes (FIG. 4C-4D). Lastly, Coors Light labeled bottles were soaked at 55-65° C. (131-149° F.) with formula 42-2, results shown in FIGS. 5A-5B. Similar to the results for formula 42-1, formula 42-2 was shown to be an effective solvent solution as the ink and laminated coating began to come off at ca. 1 minute and the label was removed in 3.25 minutes.

Example 3

Additional neck foil label removal experiments were conducted in a similar manner as described in Example 2. Formulas 38-1, 38-2, 38-3, and 38-4 were prepared to be analyzed (Table 5). Formulas 38-1 (Stabilon BPU) and 38-3 (Stabilon WTN) were used as comparative formulations and are commonly used in bottle washing. Formulas 38-1 and 38-2 are remakes of 38-1 and 38-3, respectively, with the inclusion of DBU. Testing was performed using Brahva Beats labeled bottles as described above, except labels were allowed to soak for 2 minutes at 50-60° C. (122-140° F.) before removing and rinsing under a slow stream of warm tap water.

TABLE 5

|  | Formula 38-1 | | Formula 38-2 | | Formula 38-3 | | Formula 38-4 | |
| --- | --- | --- | --- | --- | --- | --- | --- | --- |
| Component | Wt., gr. | Wt. % | Wt., gr. | Wt. % | Wt., gr. | Wt. % | Wt., gr. | Wt. % |
| Water Zeolite Softened TNK |  |  |  |  | 61.82 | 62.78 | 50.00 | 46.46 |
| DBU (1,8-Diazabicyclo[5.4.0]undec-7-ene) |  |  | 5.54 | 5.54 |  |  | 10.02 | 9.31 |
| Citric Acid Monohydrate |  |  |  |  | 5.51 | 5.60 | 5.56 | 5.17 |
| Gluconic Acid 50% |  |  |  |  | 25.01 | 25.40 | 15.09 | 14.02 |
| Bayhibit AM 50% |  |  |  |  | 1.09 | 1.11 | 1.06 | 0.98 |
| Dequest 2010 |  |  |  |  | 5.04 | 5.12 | 5.07 | 4.71 |
| Sodium Xylene Sulfonate, 40% |  |  |  |  |  |  | 15.81 | 14.69 |
| Sodium Sulfate Anhd Fine Fran | 37.12 | 36.86 | 37.01 | 37.04 |  |  |  |  |
| Sodium Gluconate Granular | 20.31 | 20.17 | 20.69 | 20.71 |  |  |  |  |
| STPP Anyd Gran Hi Density | 25.1 | 24.93 | 20.09 | 20.11 |  |  |  |  |
| Na4 EDTA Pwd. 4 H$_2$O | 10.02 | 9.95 | 9.04 | 9.05 |  |  |  |  |
| Trisphosphono Methy Amine 50% | 0.62 | 0.62 | 0.57 | 0.57 |  |  |  |  |
| Pluraface LF-131 IBC | 3.03 | 3.01 | 3.03 | 3.03 |  |  |  |  |
| Ethylenediamine EO-PO | 4.5 | 4.47 | 2.55 | 2.55 |  |  |  |  |
| Steposol MET-10U |  |  | 1.39 | 1.39 |  |  | 5.01 | 4.66 |
| Total | 100.70 | 100.00 | 99.97 | 100.00 | 98.47 | 100.00 | 107.62 | 100.0 |

Figures 6A, 6B:
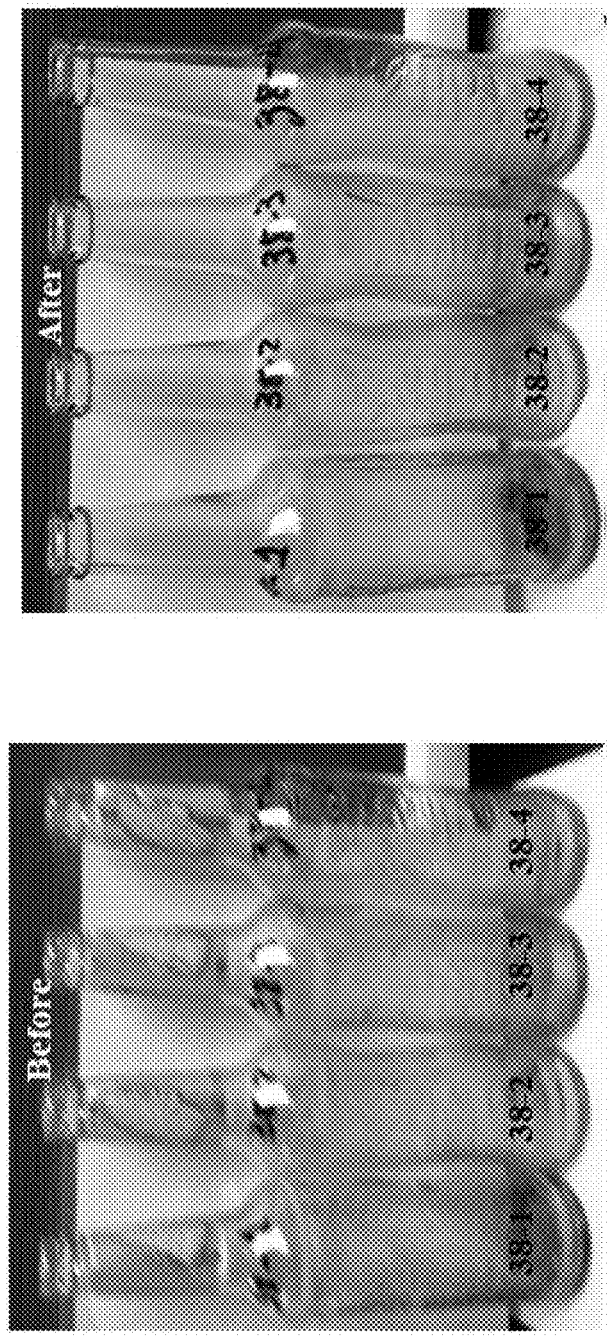
FIGS. 6A-6B show neck foil label removal experiments with Experimental formulas 38-1 to 38-4 before (FIG. 6A), and after (FIG. 6B) according to embodiments of the invention.

All four labels were removed in this timeframe with no residual adhesive visible, shown in FIG. 6B. These results demonstrate the exemplary solvent formulations of the present invention are efficient in removing bottle neck labels and adhesive when compared to commonly used bottle washing formulations.

Example 4

Additional label removal testing was conducted to evaluate additional experimental formulas. Formulas 49-1 (DBU based, no Steposol MET-10U) and 49-2 (DBU and Glucopon 425N based) (Table 6) were prepared and 120 mL of each solution were added, neat, to beakers. Beck's beer bottles were inverted and placed into beakers allowing the neck labels to soak for 10 minutes at 50-60° C. (122-140° F.), with no agitation.

TABLE 6

|  | Formula 49-1 | | Formula 49-2 | |
| --- | --- | --- | --- | --- |
| Component | Wt., gr. | Wt. % | Wt., gr. | Wt. % |
| Water Zeolite Softened TNK | 425.41 | 84.97 | 409.94 | 81.96 |
| Sodium Xylene Sulfonate, 40% |  |  |  |  |
| DBU (1,8-Diazabicyclo[5.4.0]undec-7-ene) | 50.06 | 10.00 | 50.02 | 10.00 |

TABLE 6-continued

|  | Formula 49-1 | | Formula 49-2 | |
| --- | --- | --- | --- | --- |
| Component | Wt., gr. | Wt. % | Wt., gr. | Wt. % |
| Eastman's Omnia Solvent |  |  |  | 25.10 |
| Glucopon 425N (Alkyl Polyglycoside) |  |  | 15.05 | 3.01 |
| Makon NF-5 | 15.05 | 3.01 | 15.15 | 3.03 |
| BIO-SOFT S-101 | 10.13 | 2.02 | 10.03 | 2.01 |
| Total | 500.65 | 100.00 | 500.19 | 100.00 |
|  | pH 12-14 | | pH 12-14 | |

Figure 7A:
FIGS. 7A-7B show Beck's Beer bottles after soaking in Experimental formulas 49-1 to 49-2 according to embodiments of the invention.
Figure 7B:

FIGS. 7A-7B, show variable efficiency in label removal. Formulas 49-1 and 49-2 removed the labels with some residual glue remaining.

Example 5

Additional label removal testing was conducted to evaluate additional experimental formulas. Bottles were inverted and placed into beakers allowing the neck labels to soak for 6 minutes at 60° C. (140° F.), with no agitation and recorded label removal time for each of the formulations. Formulas 50-1, 50-2, 50-3, 50-4, 50-5, and 50-6 were prepared to be analyzed (Table 7). Beck's beer bottles were placed into beakers allowing the labels to soak for 6 minutes at 60° C. (122-140° F.), with no agitation.

TABLE 7

| Component | Formula 50-1 Wt. % | Formula 50-2 Wt. % | Formula 50-3 Wt. % | Formula 50-4 Wt. % | Formula 50-5 Wt. % | Formula 50-6 Wt. % |
| --- | --- | --- | --- | --- | --- | --- |
| DBU (1,8-Diazabicyclo[5.4.0]undec-7-ene) | 2.00 | 2.00 |  | 2.00 | 2.00 | 0.03 |
| Stabilon BPU |  | 0.3 |  | 0.3 | 0.015 |  |
| Sodium hydroxide |  |  | 2.0 | 1.0 |  | 2.0 |
| MET 10 |  |  |  |  | 0.015 |  |

Figure 8:
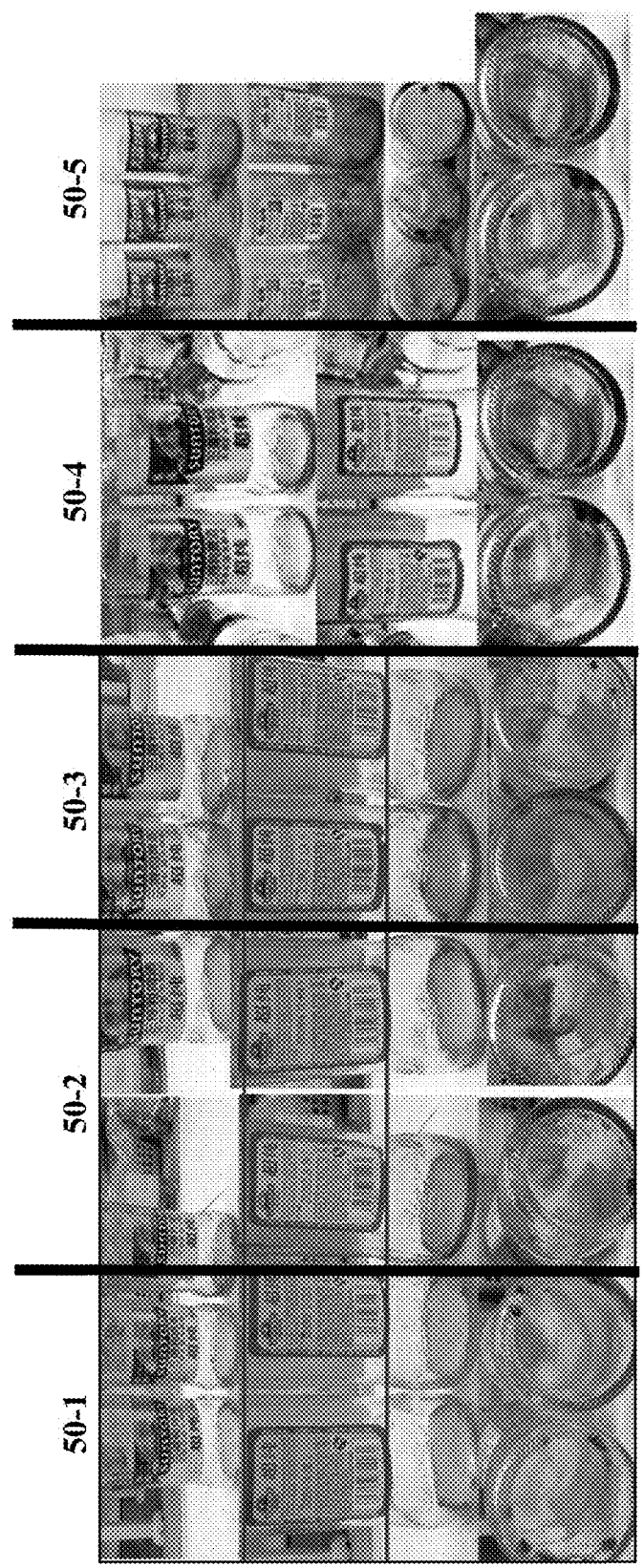
FIG. 8 shows bottles prior to soaking in Experimental formulas 50-1 to 50-6 according to embodiments of the invention.

FIG. 8 show bottles for each formula prior to cleaning. In comparison to FIG. 9, which shows results after soaking, Formulas 50-1 and 50-2 performed better than Formula 50-3, which had residual labels remaining. Additionally, results are summarized in Table 8.

TABLE 8

|  | Front Label Time for Removal | Back Label Time for Removal | Glue | Mold |
| --- | --- | --- | --- | --- |
| Formula 50-1 | 4'30 | 6'30 | Stay | Tiny |
|  | 4'00 | Fail with 8'00 | No | Tiny |
| Formula 50-2 | 4'12 | 7'00 | No | No |
|  | 3'45 | 6'00 | No | Tiny |
| Formula 50-3 | Fail with 6'00 | 2' | Tiny | Tiny |
|  | 2'05 | 3'50 | No | Tiny |
|  | 2'30 | 5'30 | Glue Residue | Still Present |
|  | 4'00 | 3'22 | Glue Residue | Still Present |
|  | 2'17 | 3'22 | Glue Residue | Still Present |
| Formula 50-4 | 1'20 | 1'30 | No | No |
|  | 2'30 | 2'52 | No | No |
| Formula 50-5 | 2'30 | 2'15 | No | Tiny |
|  | 3'05 | 5'38 | Tiny | Tiny |
|  | 2'12 | 1'20 | No | Tiny/Transparent |
| Formula 50-6 | 1'50 | 5'00 | Glue Residue | Still Present |
|  | 2'26 | 4'18 | Glue Residue | Still Present |
|  | 2'40 | 2'30 | No | Still Present |

Figure 9:
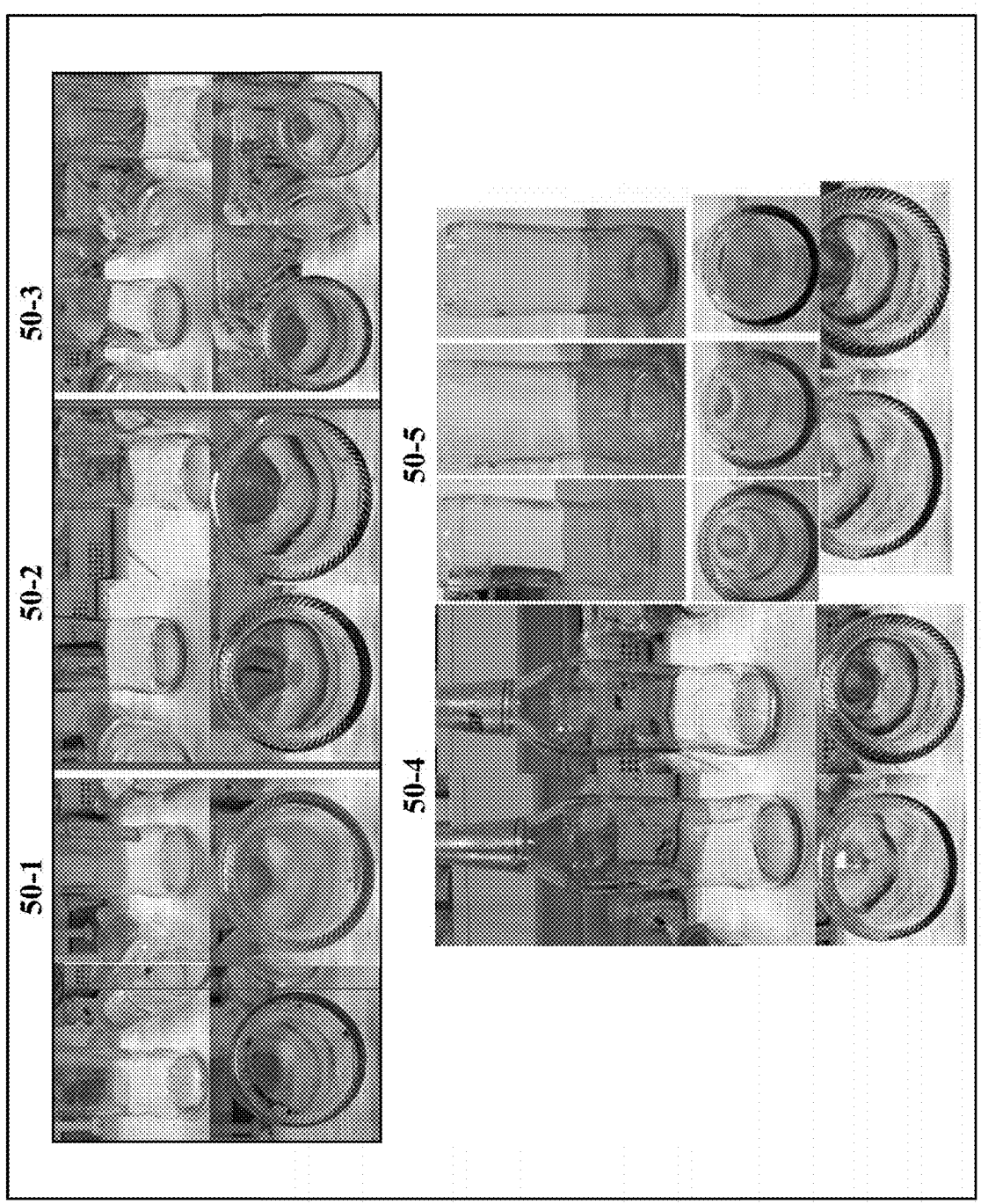
FIG. 9 shows bottles after soaking in Experimental formulas 50-1 to 50-6 according to embodiments of the invention.

As shown in Table 8 and FIGS. 8 and 9, the formulations according to the present invention provided superior glue and mold removal in comparison to Formula 50-3, i.e., caustic only compositions. Additionally, Formula 50-4 with reduced caustic in the presence of DBU provides superior removal in comparison to caustic only formulations.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A method for bottle washing comprising:
applying a label removing composition to a bottle in need of washing,
wherein the label removing composition comprises water in an amount less than about 70 wt-% of the composition, an aqueous or non-aqueous basic organic solvent and/or an amidine solvent, a surfactant, wherein the composition contains caustic in an amount from about 0 wt-% (caustic free) to about 2 wt-%, wherein the aqueous or non-aqueous basic organic solvent comprises an amine and/or amide solvent; and
washing the bottle within a period of time less than about 60 minutes;
wherein the temperature of the label removing composition is below about 80° C., and
wherein the pH of the label removing composition is between about 10 and about 14.

2. The method of claim 1, wherein the label removing composition has a pH between about 12 and about 14, and wherein the label removing composition is at a temperature from about 50° C. to about 60° C. and washes the bottle within a period of time less than about 30 minutes.

3. The method of claim 1, wherein the amidine solvent comprises 1,8-Diazabicyclo[5.4.0]undec-7-ene having the following structure:

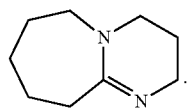

4. The method of claim 1, wherein said solvent is a fatty dialkyl amide, fatty amidoamine and/or fatty esteramine.

5. The method of claim 4, wherein said solvent is has the general structure:

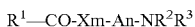

where $R^1$ is a $C_9$-$C_{16}$ chain that is linear or branched, saturated or unsaturated; X is O or NH; A is $C_2$-$C_8$ alkylene; m is 0 or 1; n is 0 or 1; and $R^2$ and $R^3$ are the same or different $C_1$-$C_6$ alkyl.

6. The method of claim 1, wherein the surfactant is an anionic surfactant and/or nonionic surfactant and optionally includes any one or more of the additional functional ingredients, and wherein the composition has a pH between about 12 and about 14 and comprises an aqueous basic organic solvent in the amount from about 0.1 wt-% to about 15 wt-%, water in an amount from about 10 wt-% to about 70 wt-%, an amidine solvent in the amount from about 5 wt-% to about 20 wt-%, and at least one surfactant in the amount from about 5 wt-% to about 40 wt-%.

7. The method of claim 1, wherein the surfactant is an anionic surfactant and/or nonionic surfactant and optionally includes any one or more of the additional functional ingredients, and wherein the composition has a pH between about 12 and about 14 and comprises an non-aqueous basic organic solvent in the amount from about 10 wt-% to about 50 wt-%, an amidine solvent in the amount from about 40 wt-% to about 70 wt-%, and at least one surfactant in the amount from about 5 wt-% to about 25 wt-%.

8. A composition for bottle washing comprising:
an aqueous or non-aqueous basic organic solvent and/or an amidine solvent;
at least one surfactant; and
water in an amount less than about 70 wt-% of the composition; and
wherein the aqueous or non-aqueous basic organic solvent comprises an amine and/or amide solvent,
wherein the composition is sodium hydroxide free, and
wherein the composition has a pH between about 10 and about 14.

9. The composition of claim 8, wherein the composition has a pH between about 12 and about 14, and wherein the surfactant is an anionic surfactant and/or nonionic surfactant.

10. The composition of claim 8, wherein the amidine solvent comprises 1,8-Diazabicyclo[5.4.0]undec-7-ene having the following structure:

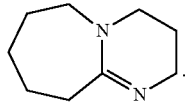

11. The composition of claim 8, wherein said solvent is a fatty dialkyl amide, fatty amidoamine and/or fatty esteramine.

12. The composition of claim 8, wherein said solvent is has the general structure:

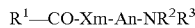

where $R^1$ is a $C_9$-$C_{16}$ chain that is linear or branched, saturated or unsaturated; X is O or NH; A is $C_2$-$C_8$ alkylene; m is 0 or 1; n is 0 or 1; and $R^2$ and $R^3$ are the same or different $C_1$-$C_6$ alkyl.

13. The composition of claim 9, wherein the surfactant comprises an alkyl sulfonate and/or alkoxylated surfactant, and further comprising at least one bottle washing additive selected from the group consisting of a defoaming agent, wetting agent, rinse aid, catalyst, corrosion inhibitor, and combinations thereof, and wherein the composition comprises an aqueous basic organic solvent in the amount from about 0.1 wt-% to about 15 wt-%, water in an amount from about 10 wt-% to about 70 wt-%, an amidine solvent in the amount from about 5 wt-% to about 20 wt-%, and at least one surfactant in the amount from about 5 wt-% to about 40 wt-%.

14. The composition of claim 13, further comprising an aromatic sulfonate material.

15. A composition for bottle washing comprising:
an aqueous or non-aqueous basic organic solvent and/or an amidine solvent, wherein the aqueous or non-aqueous basic organic solvent comprises an amine and/or amide solvent;
at least one surfactant, wherein the surfactant is an anionic surfactant and/or nonionic surfactant; and
water in an amount less than about 70 wt-% of the composition;
wherein the composition contains caustic in the amount from about 0 wt-% to about 2 wt-%, and
wherein the composition has a pH between about 10 and about 14.

16. The composition of claim 15, wherein the composition has a pH between about 12 and about 14.

17. The composition of claim 15, wherein the amidine solvent comprises 1,8-Diazabicyclo[5.4.0]undec-7-ene having the following structure:

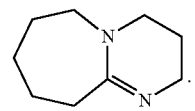

18. The composition of claim 15, wherein said solvent is a fatty dialkyl amide, fatty amidoamine and/or fatty esteramine.

19. The composition of claim 18, wherein said solvent is has the general structure:

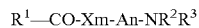

where $R^1$ is a $C_9$-$C_{16}$ chain that is linear or branched, saturated or unsaturated; X is O or NH; A is $C_2$-$C_8$ alkylene; m is 0 or 1; n is 0 or 1; and $R^2$ and $R^3$ are the same or different $C_1$-$C_6$ alkyl.

* * * * *